United States Patent [19]

Donohoe et al.

[11] 4,185,808

[45] Jan. 29, 1980

[54] CONNECTOR HARDWARE FOR PERCUSSIVE INSTRUMENTS

[75] Inventors: David G. Donohoe, Lakewood; Forrest W. Clark, Fountain Valley, both of Calif.

[73] Assignee: CBS Inc., New York, N.Y.

[21] Appl. No.: 719,249

[22] Filed: Aug. 31, 1976

Related U.S. Application Data

[63] Continuation-in-part of Ser. No. 629,888, Nov. 7, 1975, abandoned, said Ser. No. 629,888, is a continuation of Ser. No. 548,571, Feb. 10, 1975, abandoned.

[51] Int. Cl.[2] ............ F16M 13/00

[52] U.S. Cl. ............ 248/295 R; 403/344

[58] Field of Search ............ 248/159, 295R, 296, 248/411, 413, 226.2, 226.5, 225.4, 230, 217.2; 403/344, 284

[56] References Cited

U.S. PATENT DOCUMENTS

| | | | |
|---|---|---|---|
| 774,683 | 11/1904 | Martin | 248/413 |
| 874,115 | 12/1907 | Pennell | 403/356 |
| 1,047,306 | 12/1912 | Schaak | 248/230 X |
| 1,149,762 | 8/1915 | Hendrickson | 248/225.3 |
| 1,153,320 | 9/1915 | Klenck | 248/217.2 X |
| 1,200,143 | 10/1916 | Schrade | 74/574 X |
| 1,409,023 | 3/1922 | Price | 403/344 X |
| 1,610,730 | 12/1926 | Baler | 248/411 X |
| 2,151,768 | 3/1939 | Humeston | 248/316 R |
| 2,524,518 | 10/1950 | D'Arcy | 84/411 |
| 2,731,696 | 1/1956 | Sutton | 24/249 LS |
| 2,765,136 | 10/1956 | Knapp | 248/125 X |
| 2,854,880 | 10/1958 | Waters | 84/421 |
| 3,021,744 | 2/1962 | Kester | 84/421 |
| 3,030,847 | 4/1962 | Thompson | 84/422 |
| 3,059,948 | 10/1962 | Thompson et al. | 403/90 |
| 3,176,812 | 4/1965 | Towne | 192/71 |
| 3,191,484 | 6/1965 | Walling | 84/421 |
| 3,203,657 | 8/1965 | Thompson | 248/171 |
| 3,535,796 | 10/1970 | Osuga | 84/421 |
| 3,541,914 | 11/1970 | Thompson | 84/421 |
| 3,548,068 | 12/1970 | Thompson | 84/422 |
| 3,561,716 | 2/1971 | Thompson | 248/286 |
| 3,576,149 | 4/1969 | Slingerland | 84/421 |
| 3,626,458 | 12/1971 | Zickos | 84/411 |
| 3,704,645 | 12/1972 | Grauso et al. | 84/421 |

FOREIGN PATENT DOCUMENTS

| | | | |
|---|---|---|---|
| 274751 | 5/1914 | Fed. Rep. of Germany | 248/226.2 |
| 865588 | 4/1961 | United Kingdom . | |
| 934915 | 8/1963 | United Kingdom . | |
| 1300158 | 12/1972 | United Kingdom . | |
| 1325708 | 8/1973 | United Kingdom | 248/222.1 |
| 1333333 | 10/1973 | United Kingdom . | |

OTHER PUBLICATIONS

Applicant's Public Use Document.
Rogers Drums Catalog, 1973–1974.
Rogers Drums with Memriloc Hardware, Catalogue 1976–1977.
Rogers Drums Catalog, 1967–1968.
Rogers Drums with Memriloc Hardware, Parts and Accessories Catalog, 1976–1977.
Rogers Drums Catalog, Form No. 239, copyright 1970.
Rogers Drums Catalog, Form No. 240, copyright 1970.
Rogers Drums Parts Catalog, Form No. 247, Nov. 1971.

*Primary Examiner*—William H. Schultz
*Attorney, Agent, or Firm*—Richard L. Gausewitz

[57] ABSTRACT

The connector hardware portion of each percussive musical instrument or accessory comprises strong, practical, rugged, and economical connector parts, one of which is a clamp adapted to grip solidly onto a tube at any desired rotated and axial position, and the other (second) of which is connected to a percussive instrument or accessory portion and is adapted to lock onto the clamp in a way that prevents both rotational and axial shifting relative thereto. The locking is effected in a readily removable manner, as by means including a set screw, and the relationship is such that there can be only one position of the other (second) part relative to the clamp after locking has occurred. Therefore, once the clamp is initially set at a desired rotated and axial position, there is an automatic rotational and axial "indexing" which permits any number of separations and re-connections of the two parts (and of the percussive instrument or accessory) without permitting the locked positions to change.

The clamp is generally C-shaped and has lugs which, when moved towards each other, as by a fastener, effectively lock the clamp at the desired rotational and axial position on the tube. The other (second) part is a receiver which receives at least part of the clamp, having an opening therein through which the lugs extend. Withdrawal of the clamp from the receiver is prevented by a set screw which engages the clamp or an extension thereof.

39 Claims, 28 Drawing Figures

FIG. 3.
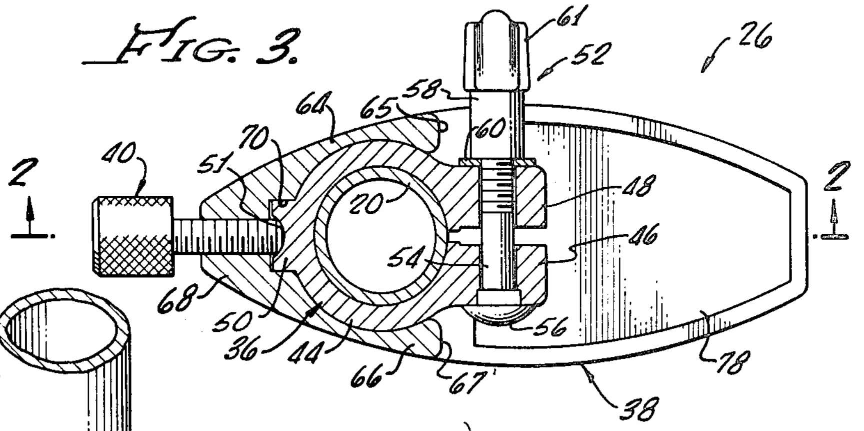
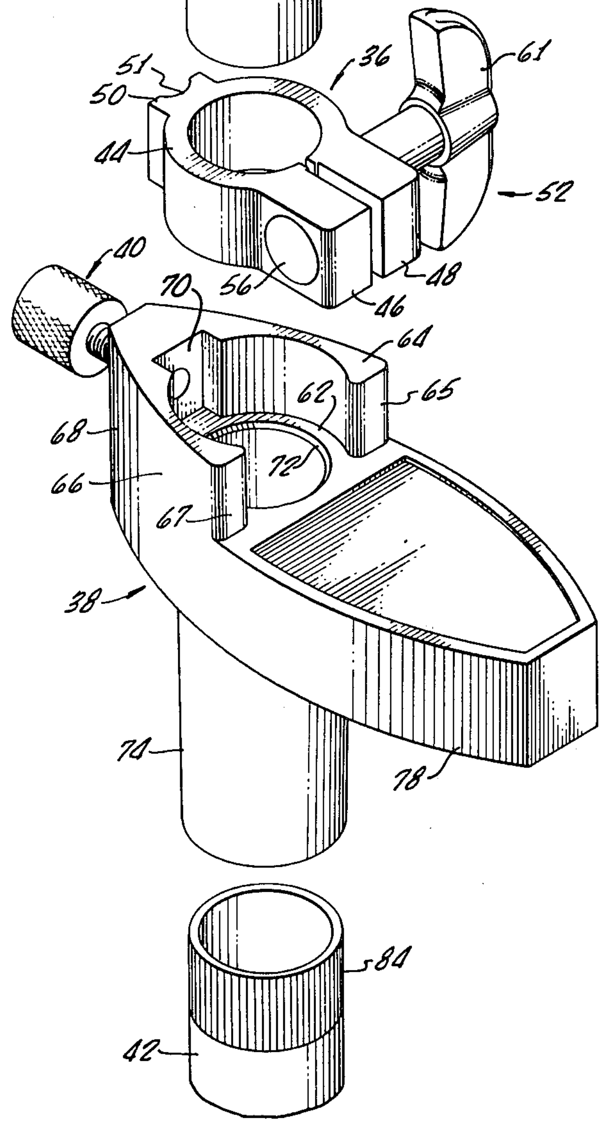
FIG. 4.

FIG. 5.
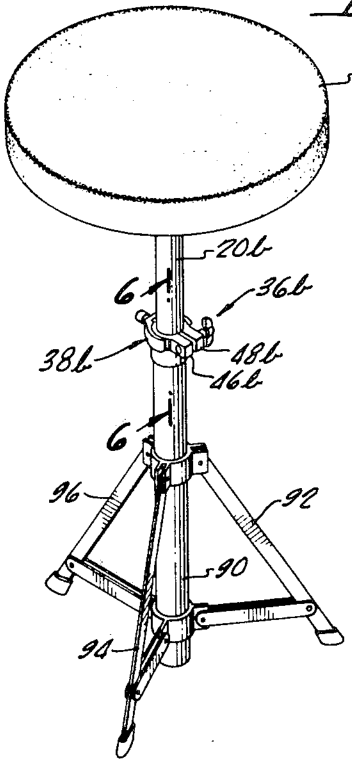
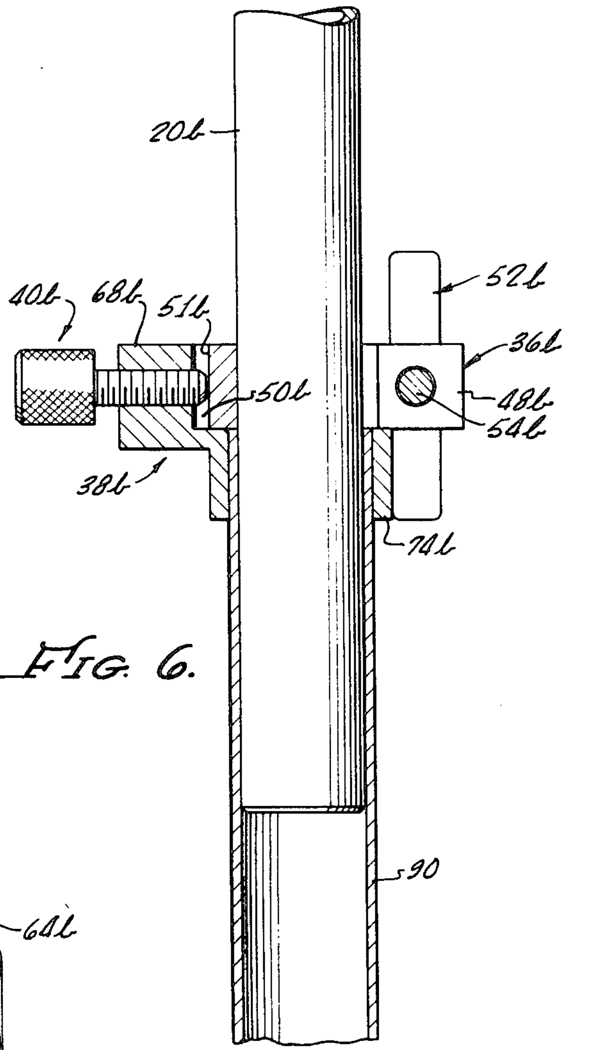
FIG. 6.
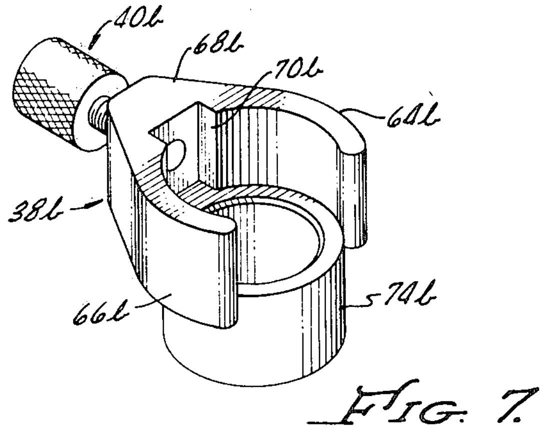
FIG. 7.

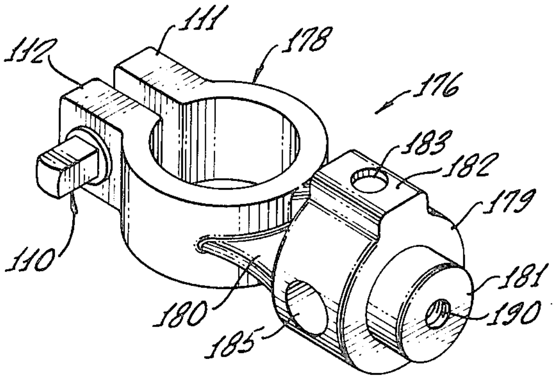
FIG. 21.
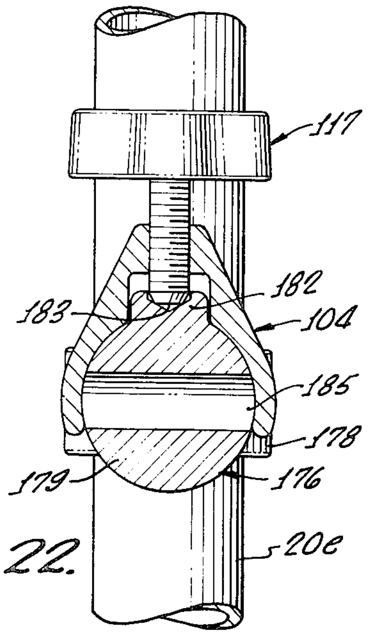
FIG. 22.
FIG. 23.
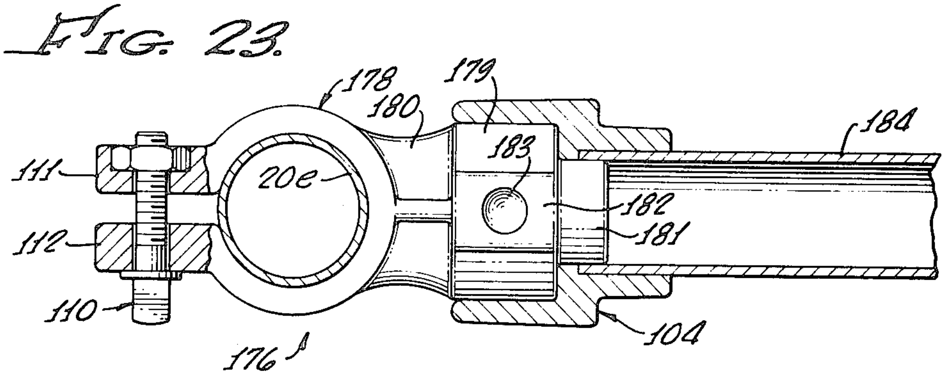
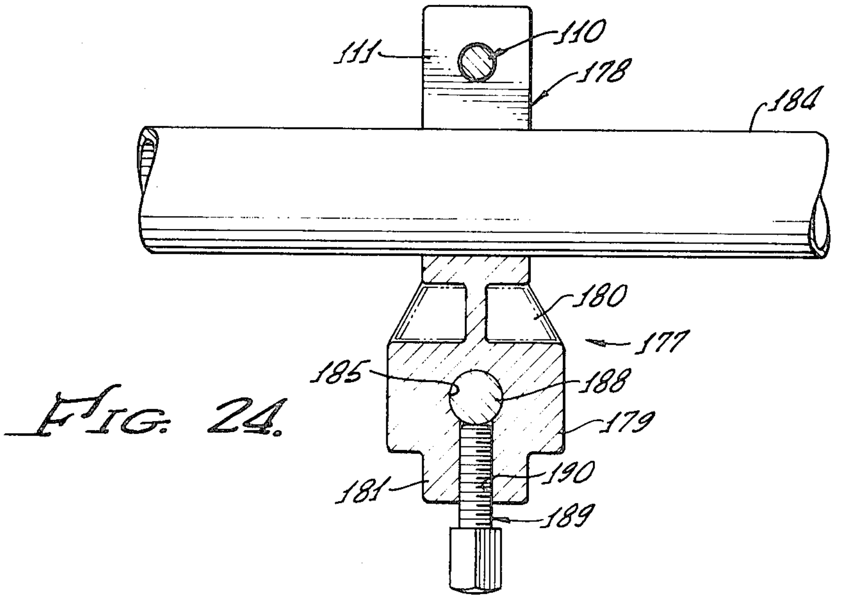
FIG. 24.

FIG. 25.
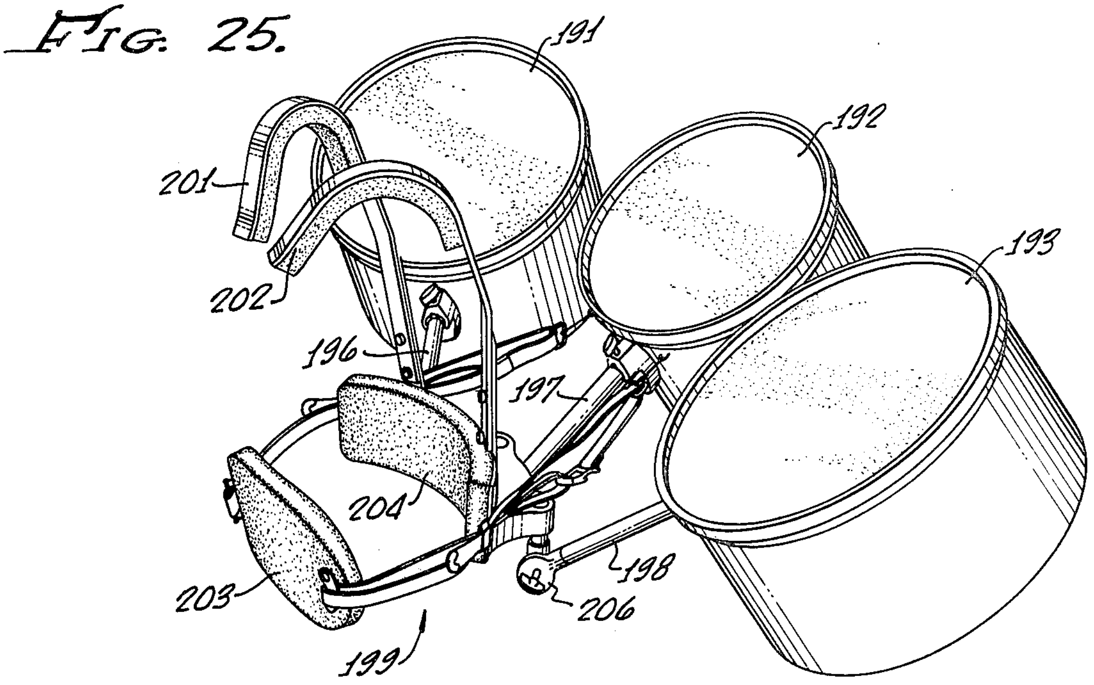
FIG. 26.
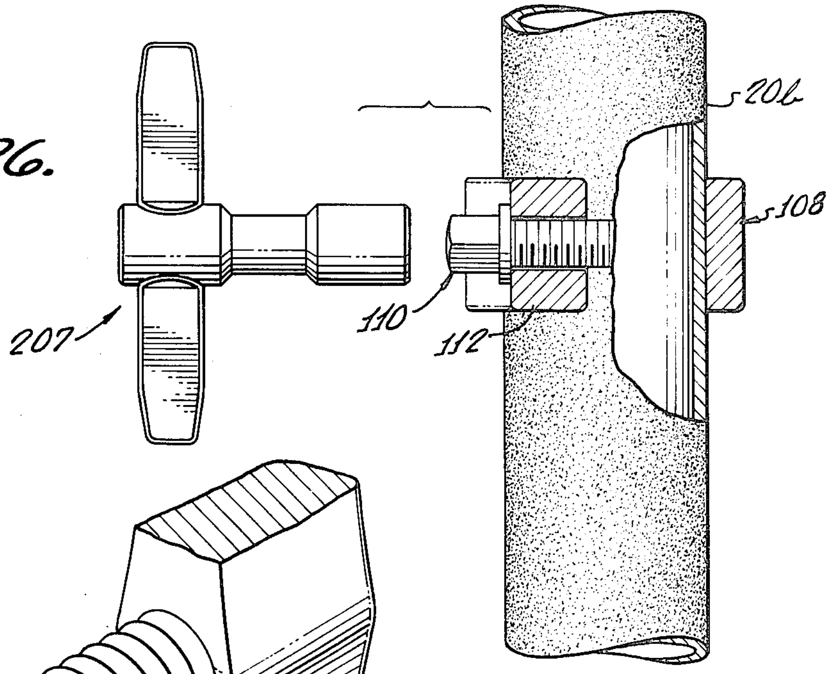
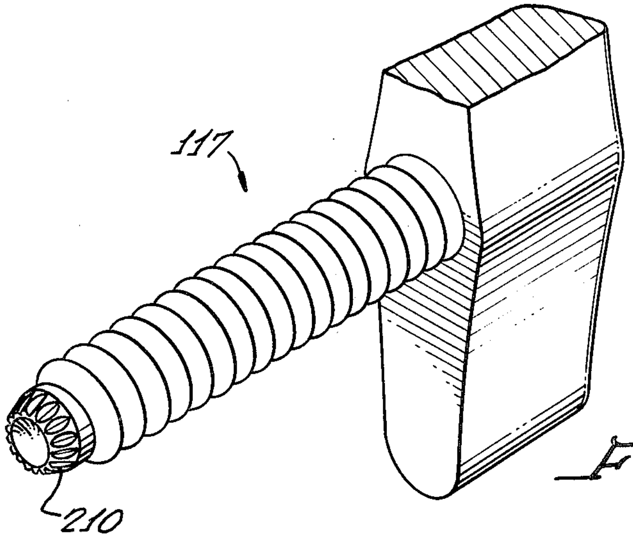
FIG. 27.

CONNECTOR HARDWARE FOR PERCUSSIVE INSTRUMENTS

CROSS REFERENCE TO RELATED APPLICATIONS

This application is a continuation-in-part of our pending patent application Ser. No. 629,888, filed Nov. 7, 1975, for Percussive Instrument and Accessory Support, now abandoned. Said application Ser. No. 629,888 is a continuation of patent application Ser. No. 548,571, filed Feb. 10, 1975, now abandoned.

BACKGROUND OF THE INVENTION

1. Field of the Invention

This invention is in the field of percussive musical instruments and their accessories, of hardware in or for such instruments and accessories, and of methods relating thereto.

2. Description of Prior Art

Various percussive musical instruments and accessories are commonly employed and played by a single musician (drummer) in the course of a performance. The instruments, namely drums, cymbals, tom-toms, etc., are grouped together, often being supported from a common stand and/or from a main percussive instrument such as a bass drum. The instruments are arranged in a predetermined pattern so that they may be readily played individually or collectively by the single musician.

Because of the size and bulk of the percussive instruments and accessories, they are almost invariably handled, stored and transported individually, rather than in any preestablished set-up or as any group of interconnected instruments. Accordingly, it is common practice to provide drum and accessory mounting hardware to interconnect the instruments and accessories in attachable and detachable relationship. Thus, an ensemble of instruments and accessories may be transported as individual pieces to the location of a given performance, at which location the instruments are interconnected in the desired relative positions and orientations.

Such relative positions and orientations are major factors in a performance. Each musician will carefully arrange his instrumental set-up to ensure that the various instruments are properly positioned and are presented at the desired playing angles. Having completed the performance, the instruments and accessories are disconnected, transported and then re-connected before a subsequent performance.

Insofar as applicants are aware, all prior-art hardware for drums and accessories had one or more of the following (and other) major deficiencies: inability to be set at any desired rotated position about an elongated element; requirement for a grooved or otherwise deformed tube; inability to be re-assembled at predetermined indexed positions at which both the angular relationships and the axial positions are the same as in the previous performance; lack of ruggedness and resistance to shocks, impacts and other large forces; lack of simplicity (with consequent increased manufacturing costs and decreased performance and aesthetic appeal); inability to maintain the locked relationship without wobble; inability to permit one part of one instrument or accessory to mate with a different instrument or accessory in highly modular, interchangeable relationships; and inability to pre or double lock.

The present hardware has none of the above deficiencies. Furthermore, in accordance with important aspects of the present invention, the hardware is built into various percussive musical instruments and accessories, forming rugged connector portions therein. The connections are not only pre-indexed (at any desired position) rotationally and axially, but are so strong that large forces (such as, for example, the weight of a "bouncing" drummer) will not budge them.

SUMMARY OF THE INVENTION

The hardware portion of each percussive musical instrument or accessory, or the hardware which connects together two such instruments and/or accessories, comprises a clamp adapted to clamp firmly on an elongated member at any desired rotational and axial position. The hardware portion further comprises a second part, adapted to lock to the clamp in a way which prevents both rotational and axial shifting relative thereto, such second part being connected to a percussive musical instrument, etc. The locking is preferably effected by means including a set screw which seats against the clamp or an extension thereof.

In accordance with one aspect of the invention, the clamp is cast of a relatively soft metal, preferably aluminum. The elongated member around which the clamp fits is a steel tube, externally roughened as by shot peening or sand blasting. The combined clamp and tube are relatively economical to manufacture, yet do not slip despite application of vibratory or bouncing forces far over one hundred pounds.

In the preferred embodiment the clamp has a generally C-shaped body which extends about the majority of the tube circumference. Such body has a large bearing area engaging the tube. The radial dimension of such C-shaped body is preferably substantially uniform (though not necessarily uniform at the gap in the "C") so that when the ends of the "C" are moved towards each other by a connecting fastener there will be relatively uniform bending as distinguished from a "hinge" action. The result of such substantially uniform bending is substantially uniform high bearing pressure on the tube, with consequent strong clamping force yet one which minimizes marring or damage to the tube. Such uniform bearing pressure cooperates with the above-stated roughened surface, etc., to achieve the stated important results.

In the preferred embodiment the clamp body nests in a receiver formed by the above-stated second part. The set screw extends into close engagement with the clamp or an extension thereof, preferably at a socket formed in the clamp (or extension). The set screw forms its own recess in the clamp.

The hardware is incorporated in connections between percussive musical instruments, and between portions of a single instrument or accessory. More specifically, the instruments and accessories comprise drums, cymbals, tom-toms, hi-hats, drummer's thrones, drum stands, cymbal stands, marching-drum supports, and others.

In accordance with the method, the clamp is clamped firmly on the tube which either connects two instruments or accessories or is incorporated in one of them. The clamp position is correlated to the desired position of the instrument, accessory, etc., relative to both axial and rotational factors. Then the clamp is locked to the second member, preferably the above-mentioned receiver, in the single rotated and axial position. Any number of connections and re-connections are then made without danger that the single desired position will change.

In accordance with one aspect of the method and apparatus, tightening of the set screw provides a preliminary "locking" action even before the clamp is tightened. This greatly simplifies and facilitates adjustment during initial set-up. A double locking action is achieved for final set-up.

Compound clamps are also provided, and interrelate with the above-mentioned clamps and receivers to achieve great varieties of assemblies.

In one embodiment of the hardware, first and second members that are adapted to be detachably connected together in adjusted relative positions include a first connector part fixed to the first member in a selected position of relative adjustment, and a second connector part connected to the second member. The connector parts have outwardly and inwardly facing surfaces adapted to be slidably interengaged, one within the other, in an interfitting, non-rotational relationship, with means provided to restrain withdrawal of one of the parts from the other.

BRIEF DESCRIPTION OF THE DRAWINGS

FIG. 3 is a transverse section taken on line 3—3 of FIG. 2;

FIG. 4 is an exploded perspective view of the connector hardware shown in FIGS. 1, 2 and 3;

FIG. 5 illustrates an accessory, namely a drummer's throne or stool, embodying a modified form of the hardware illustrated in FIGS. 1 through 4;

FIG. 6 is an enlarged longitudinal section taken on line 6—6 of FIG. 5;

FIG. 7 is a perspective view of the receiver part of the connector of FIGS. 5 and 6;

FIG. 21 is a perspective view of a compound connector element having both male and female portions;

FIGS. 22, 23, and 24 are enlarged sections taken at the respective section lines shown at the center of FIG. 20, and relating to elements such as the one shown in FIG. 21;

FIG. 25 is a perspective view of a support or carrier for marching drums;

FIG. 26 is a view showing one of the present clamps as mounted on a roughened tube, portions being broken away to show the surface engagement between clamp and tube; and FIG. 27 is a greatly enlarged view of the set screw.

DETAILED DESCRIPTION

DEFINITIONS, ETC.

The words "cylindrical" and "cylinder" are used, in the present specification and claims, in their common or ordinary sense, namely to denote a surface with a circular cross-section.

The word "clamp", in the present specification and claims, denotes not only the main clamp element but also any extension thereof.

The word "opening" is used, in the present specification and claims, to denote various ports, passages, apertures, recesses, etc. It is immaterial whether or not the remote (not penetrated) end of a passage is closed, such passage in either case being an "opening" as such term is here employed.

The word "aluminum" denotes, also, aluminum alloys.

The expression "C-shaped" denotes any clamp configuration wherein the clamp body extends around the elongated member (tube), such body having a gap at one point about its circumference.

Various names are used for the screw elements numbered 40 and 117 in the following detailed description, such names including "set screw", "lock screw", "clamp screw", etc. All of such elements are preferably (but not necessarily) manually operated, and thus could also be termed "thumbscrews". No implication is intended, despite use of the words "clamp screw", that any such screw connects to (as distinguished from bearing against) a clamp.

ORIGINALLY-FILED EMBODIMENTS OF THE CONNECTOR HARDWARE AND OF DRUMS AND THRONES (STOOLS) INCORPORATING THEM

Figure 1:
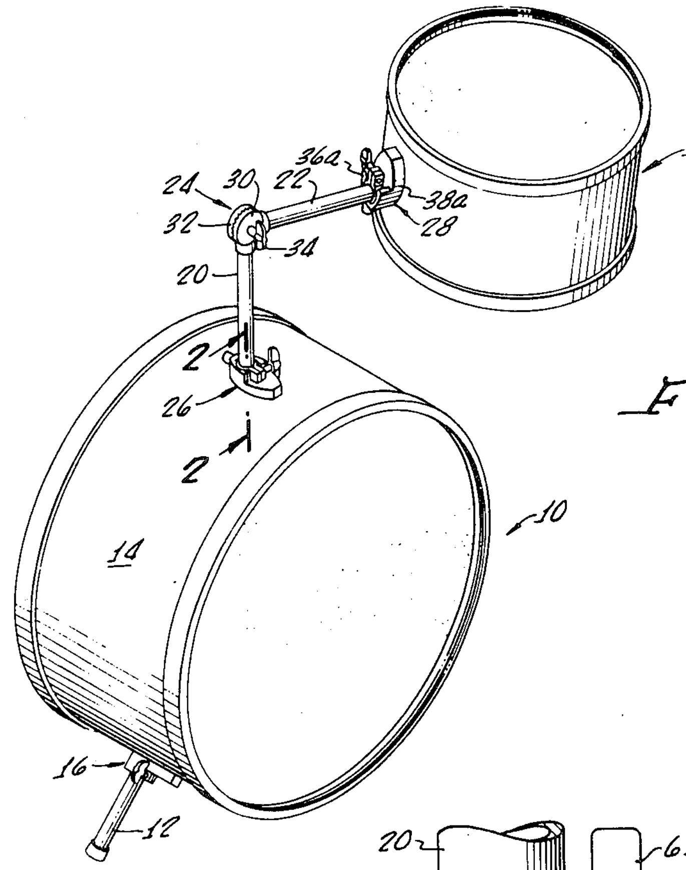
FIG. 1 illustrates percussive musical instruments detachably connected in a predetermined adjusted position and orientation by means of hardware embodying principles of the present invention.
Figure 17:
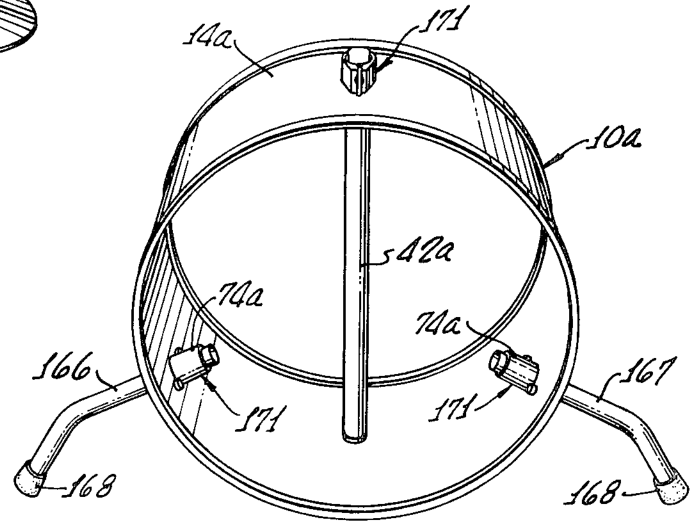
FIG. 17 is a perspective view of the bass drum, with the drumheads not shown.
Figure 18:
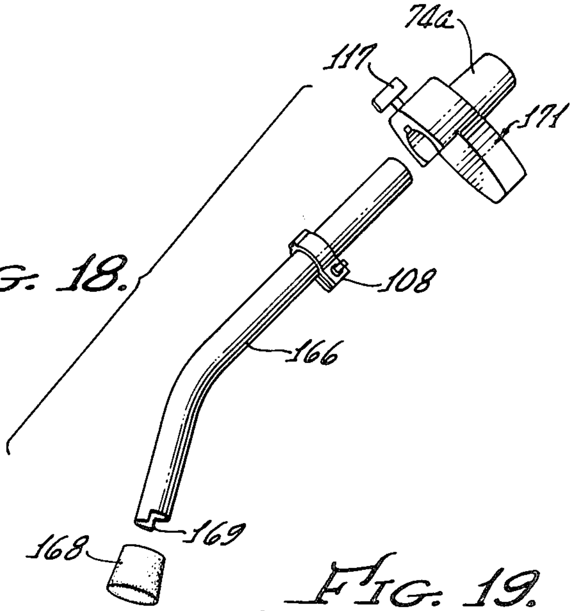
FIG. 18 is an exploded perspective view of the bass drum spur or leg.

As described in parent application Ser. No. 548,571, and as illustrated in FIG. 1, there are shown a plurality of percussive musical instruments, being exemplary of many different types and groups of percussive instrument and accessory combinations which may be interconnected or locked together by means of hardware embodying principles of the present invention. A larger instrument, such as a bass drum 10 having a shell 14, is supported on the floor by a plurality of spurs or legs, such as spur or leg 12, another identical supporting spur being attached to the shell as described below relative to FIGS. 17–18 (which FIGS. 17–18 show the production form of the spur). A second and smaller drum (or an accessory), depicted at 18, is connected in an adjustable manner, both as to position and angle, to the shell 14 of the main instrument 10 by hardware including an adjustably angulated pair of elongated support tubes or rods 20, 22 interconnected by a fitting 24. The smaller drum 18 mounted on the bass drum is usually a tom-tom.

Detachable connecting or locking hardware 26, 28 embodying principles of the present invention is provided to detachably connect the tubes 20, 22 to the drums 10, 18, respectively. Tubes 20 and 22 are fixedly connected to each other in a selected position of angular adjustment (about an axis extending normal to the axes of both tubes and through the intersection of the tube axes) by means of the fitting 24 which comprises discs 30, 32 fixed to the tubes 20, 22, respectively. Such discs have interengaging serrated faces that are clamped to each other by means of a thumb screw 34, to result in a relationship which prevents accidental or undesired turning despite substantial vibratory loads.

It is emphasized that fitting 24 need not be a ball joint, which has less ruggedness and locking ability, since each of the drums 10, 18 may rotate (when basic adjustments are being made, as described below) about its associated tube 20, 22.

Figure 2:
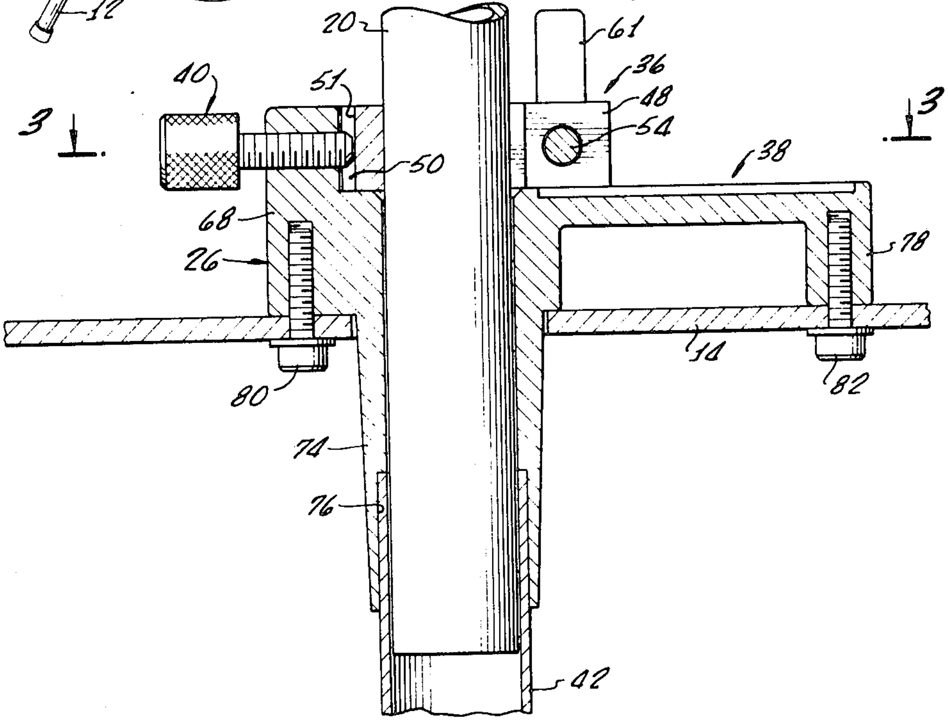
FIG. 2 is an enlarged fragmentary section taken on line 2—2 of FIG. 1.

Connector 26 is illustrated in FIGS. 2, 3 and 4 as comprising first and second connector parts 36, 38 that are constructed and arranged to be slidably interconnected in an interlocking relationship which prevents relative translational and/or rotational motions. Relative translational motion is restrained by a clamping screw 40 that forms part of connector part 38.

The parts 36, 38 are preferably formed of a strong metal, cast or otherwise formed in the disclosed configuration. Integral cast aluminum parts 36, 38 are preferred.

The connector (or lock) parts 36, 38 are adapted to be secured and rigidly connected to structural members such as (1) the above-mentioned tube 20 and (2) the shell 14 of bass drum 10. The second connector part 38 may also have a fixed connection with a brace tube 42 fixed to the bass drum 10 and extending substantially vertically therethrough (see also FIG. 17, which shows a similar brace tube **42*a*). The bottom end of brace tube 42** is secured to the inside-bottom portion of the bass drum shell.

Connector part 36 comprises a substantially tubular C-shaped clamp having a main circular body portion 44 (FIGS. 3 and 4) terminating in a pair of mutually spaced, juxtaposed and radially extending clamp lugs 46, 48 which are formed integrally with the body section 44. Also formed integrally with the body section 44, and projecting radially outwardly therefrom and diametrically opposed to the clamp lugs, is a key 50. Key 50 is formed with an outwardly facing, longitudinally extending groove or socket 51 for reception of the end of clamp (set or lock) screw 40.

The stated interengagement of the screw 40 and groove 51 not only restrains withdrawal of the connector part 36 but also is one factor restraining rotation, relative to each other, of the connector parts about the axis of body portion 44.

A clamp fastener assembly 52 includes a carriage bolt 54 having a head 56 that bears upon an outer surface of lug 46. The bolt 54 extends non-rotatably through apertures in both lugs 46, 48 and is threaded into the shank 58 of a wing nut 61. A washer 60 (FIG. 3) is interposed between the end of shank 58 and an outer surface of lug 48. Turning wing nut 61 causes the lugs 46, 48 to be drawn toward each other and thus lock the member 20 that extends through the tubular body section 44.

The second connector part 38, the receiver, has a body section comprising a bottom wall 62 and a pair of fixed diametrically opposed upstanding side walls 64, 66. The side walls are interconnected by an intermediate receiver body section 68 in which is formed a keyway 70. Bottom wall 62, and similar walls in other embodiments, form the seats for clamp 36, etc.

An aperture or opening 72 is formed through the bottom (seat) wall 62 of the receiver, and through a tubular depending section 74 of the receiver body, to slidably receive a portion of tube 20 which extends beyond the connector clamp part 36. Lower tubular section 74 is recessed or counterbored as at 76 (FIG. 2) to receive the upper end of brace tube 42, the latter having an inside diameter large enough to receive the supporting tube 20.

A projecting body section 78 is formed as an integral part of the receiver 38 and projects outwardly in opposition to the intermediate section 68, with the aperture 72 interposed therebetween. Securing means such as screws 80, 82 (FIG. 2) extend through the drum shell 14 into threaded engagement with the receiver body at the intermediate section 68 and at the outer end of projecting section 78. The upper end of tube 42 is preferably longitudinally serrated as at 84 (FIG. 4) to cooperate with the inner surface of tubular section 74 (which may be either smooth or serrated to mate with serrations 84) so as to enhance the securement of the receiver 38 to the drum, there being a press-fit relationship between elements 42 and 74.

Receiver 38 is thus fixedly attached to the drum shell 14 and is normally left in place in its position of rigid attachment to the drum. One or more additional receivers identical to receiver 38 may also be attached at different points of the drum shell 14 for reception and support of the same or other instruments or accessories that are furnished with the mating clamp part. In addition, identical receivers may be fixed to the drum shell to detachably connect drum-supporting spurs or legs, as described hereinafter.

Clamp 36 is slidably adjusted along the length of support tube 20 until a desired position of relative axial adjustment is obtained. The clamp 36 is also rotated about the axis of the tube until a desired position of relative rotational adjustment is obtained. Thereupon clamp bolt assembly 52 is tightened to draw lugs 46 and 48 toward each other and rigidly, securely and permanently (as long as wing nut 61 is tight) fix the clamp 36 to the support tube 20, with the latter projecting through the aperture in the tubular clamp body 44 and extending downwardly therethrough.

The two connector parts 36 and 38, each attached to an instrument or other part of the percussive ensemble that is to be interconnected, are then simply interfitted by sliding the clamp 36 down into the recess defined within the receiver 38. For the initial adjustment of position and orientation, the clamp part may be relatively loosely secured to tube 20. The clamp part is then inserted into the receiver part and a final adjustment of tube 20 (together with the instrument or accessory carried thereby) is made. Then the wing nut 61 is tightened in this finally adjusted position.

Alternatively, the clamp 36 may be first interfitted to and within the receiver 38 and locked thereto by tightening clamp screw 40. Then the support shaft 50 may be inserted into and through the coaxial apertures in the clamp body section 44 and the receiver body section. Tubular support 20 is then moved axially up and down (in the illustration of FIG. 1) and rotated until the instrument 18 (or accessory) is properly adjusted in position and orientation, whereupon clamp bolt assembly 52 is tightened to cause the clamp 36 to be rigidly fixed to the tubular support 20.

Thus, by moving the support tube 20 axially and rotationally relative to and within the connector clamp 36, the drum 18 (or accessory) carried by the tubular support 20 is adjusted in position and orientation, with respect to the primary support or drum 10, until drum 18 attains a desired position and orientation. It will remain in such position and orientation as long as the clamp 36 is tight upon the encircled support tube 20 and the clamp is held within the recess of the receiver 38.

The connector clamp 36 is formed with the circular body section 44 that defines an aperture which snugly receives the cylindrical support tube 20. Nevertheless, the illustrated connector clamp has an external surface of a noncircular configuration. Such noncircular configuration includes the circular portion of the body section 44, and also includes the radially-oppositely disposed projecting key or extension 50 (with its groove 51) and the clamp lugs 46, 48. Receiver 38 includes the side walls 64, 66 and the intermediate section 68 that define an inwardly facing surface of a noncircular configuration. The latter surface mates (FIGS. 1–3) with the noncircular surface configuration of the clamp 36 (except for the groove 51). Thus the clamp 36 is slidably and snugly received in an interlocking nonrotational relationship within the recess of the receiver 38, even in the absence of clamp screw 40.

The side walls 64, 66 (which project to the right as viewed in FIG. 3) have right ends 65, 67 which are mutually spaced to receive the radially-outwardly projecting clamp lugs 46, 48 and, furthermore, to cooperate with these lugs in limiting relative rotation of the clamp 36 and receiver 38. Nevertheless, the closer fit of key 50 within keyway 70 comprises a major restraint against relative rotation of clamp 36 and receiver 38. The fit of screw 40 into groove 51 affords a third restraint against such relative rotation.

It will be readily appreciated that key 50 and keyway 70 may be interchanged, that is, the key may be formed as an inwardly directed projection of the receiver 38, projecting into the recess defined therein and cooperating with an outwardly facing keyway formed in an outer surface of the connector clamp 36.

Further, instead of employing the relatively simple circular body section 44 and interfitting key and keyway means 50, 70, for preventing relative rotation of the clamp parts, the present invention contemplates forming the exterior of the connector clamp in other forms of noncircular configuration, such as polygonal, elliptical and the like, and concomitantly forming the inwardly facing surface of the recess of connector receiver 38 with a congruent noncircular configuration to snugly and slidably receive the connector clamp in nonrotational interlocking engagement.

Although other noncircular external clamp part configurations may be employed, it is found that the clamping action (e.g. the gripping of tube 20 by clamp part 36) is considerably enhanced by forming as much of the body section 44 as possible with a uniform thickness, as measured radially. If the body thickness is uniform the body will bend more uniformly under the pressure of the clamp bolt assembly 52, and thereby firmly grip the circumscribed tube 20 relatively uniformly about a greater area of its circumference.

It is also contemplated that means other than the clamp screw 40, such as locks, detents or retractable pin and aperture arrangements, may be employed to restrain slidable withdrawal of the clamp 36 from the recess of the receiver 38.

Outwardly projecting body section 78 of receiver 38 provides a relatively widely spaced base for the two screws 80, 82 (FIG. 2), thereby providing a more stable, rigid and firmly secured attachment of the receiver to the drum shell 14. The interengagement of the fixed drum tube 42 with the downwardly projecting end of receiver section 74 further enhances the rigidity of attachment of the receiver to the drum.

Once the parts are interfitted and interconnected or interlocked as illustrated in FIGS. 1, 2 and 3, support tube 20 and the accessories or instruments carried thereby are firmly and securely attached to and supported by the bass drum 10. Yet the parts are quickly and readily detached from and reattached to one another without in any way disturbing the relative adjustment (position and orientation) of the accessories with respect to the primary instrument or support.

Thus, to disconnect the parts, it is merely necessary to loosen clamp screw 40 of hardware 26 and slidably remove the clamp 36 from its engagement with the receiver 38, carrying the drum (or accessory) 18 together with the interconnecting support tubes 20, 22 therewith. Thus, the entire drum or accessory assembly, including elements 18, 20 and 22, is detached as a unit merely by loosening the clamp screw 40. In addition, drum 18 is similarly detached from (and later attached to) tube 22 by the connector hardware 28 which is identical (or substantially identical) to that described in detail above.

Conversely, to relock or reattach the drum or accessory assembly 18, 20 and 22 in the very same preselected position of adjustment and orientation, it is merely necessary to slidably inert the clamp 36 into the associated recess of receiver 38, into which it can fit in only a single position of translational and rotational relation, and thereupon to retighten the clamp screw 40 to prevent inadvertent withdrawal. The described connector parts may be considered to incorporate a predetermined index means that stores a selected position and orientation (both axially and rotationally).

Although a close fit of the tubular support 20 to and within the receiver section 74 and primary instrument tube 42 will enhance the rigidity of the interconnection, the clamp part 36 may be adapted for use with tubular supports of smaller diameter than the diameter of receiver section 74 or the inside diameter of tube 42. This is done by providing a clamp part 36 having a somewhat smaller inside diameter. By its very nature the C-shaped connector clamp part 36 adjusts itself to a substantial tolerance of outside diameters of supporting tubes 20, and may be readily clamped on such tubes even though they are of somewhat smaller outside diameter than that illustrated.

The rigid, secure and fixedly positioned and oriented interconnection of the two clamp parts is achieved without depending upon the interfit of tubular support 20 and elements 74 or 42. It is accomplished by means of the interfitting and interlocking relationship between the clamp and receiver. This interfitting relationship in and of itself provides a firm and secure restraint against all relative rotational motion of the connector parts about any axis, and against translational motion in all directions except the direction extending axially of the tubular support 20. Restraint against translational motion in such direction, and additional restraint against relative rotation, are provided by clamp screw 40 and groove 51.

The hardware 28 illustrated in FIG. 1, which connects the drum 18 with the support tube 22, comprises clamp part 36a that is identical in all respects to clamp part 36 of FIGS. 2, 3 and 4. Clamp part 36a interfits with a connector receiver part 38a having recess and keyway configurations (for an interlocking snug and sliding fit with the connector clamp part) identical to those described in connection with FIGS. 2, 3 and 4. However, in this receiver 38a, the depending section 74 of FIG. 2 may be omitted, and connection to the shell of accessory drum 18 achieved solely by use of screws corresponding to those indicated at 80, 82 of FIG. 2.

Similarly, the connector hardware 16 supporting each of the spurs or legs 12 of the bass drum 10 may include a connector clamp part identical to clamp part 36 and a connector receiver part identical to receiver part 38 of FIGS. 2, 3 and 4. Depending section 74 may be omitted from the receiver parts. There may also be employed certain other configurations, structures and arrangements for connecting the receiver 38 or 38a to the member that is to be used for support of the coupling.

DRUMMER'S THRONE OR STOOL

Referring to FIGS. 5, 6 and 7, there is shown a drummer's throne (stool) which includes a pedestal having a central tubular standard 90 supported by a plurality of foldable legs 92, 94, 96. Such legs are connected in a conventional collapsible manner to the standard 90. In this construction, the receiver 38b includes a relatively short depending tubular section 74b having an internal aperture that fixedly receives the upper end of pedestal standard 90. Section 74b is rigidly connected to standard 90 as by welding, rivets, bolts or the like.

Remaining portions of the receiver 38b, including the sections defining the recess that interfits and interlocks with the connector clamp part 36b, are identical to corresponding parts previously described. In this construction, however, the outwardly projecting section 78 is omitted. The clamp part lugs 46b, 48b project between the sidewalls 64b, 66b that cooperate with the intermediate section 68b, having keyway 70b formed therein, to snugly and slidably receive the clamp.

The clamp 36b is identical to that previously described and is clamped in a selected position of adjustment to a lower portion of a tubular support 20b which telescopes downwardly into standard 90. Support 20b carries at its upper end a seat (or other percussive instrument accessory) 98. The clamp 36b is fixedly connected to the tubular support 20b in a desired position of adjustment.

The tubular support 20b, together with the seat 98 carried thereby, is readily attached to and detached from the standard 90 in the manner previously described. This is achieved by slidably inserting the clamp 36b into the recess formed in receiver part 38b, the tubular support 20a extending into slidable engagement to and within the interior of hollow standard 90. The lower surface of the clamp 36b seats directly upon the bottom wall of the recess formed in the receiver 38b just as in the previously described embodiment. The clamp screw 40b is then rotated, in its threaded opening in receiver part 38b, until its end bears firmly upon the bottom of groove or socket 51b of projecting key or extension 50b of the clamp.

It will be understood that the receiver parts may be permanently or semipermanently secured to various percussive musical instruments and accessories so that these may be interconnected in detachable and precisely repeatable positions of relative adjustment, both axial and angular, by means of angulated tubing assemblies such as the assembly 20, 22, 24 of FIG. 1. Such tubing assemblies have adjustably secured thereto, at each free end of the assembly, a clamp of the type described herein. The number and variety of interconnected arrangements of accessories and primary instruments or supports is limited only by available space and by the strength of the supporting structure.

There have thus been described clamping structures for detachably and repeatably interconnecting parts of percussive instruments and accessories, in precisely desired positions of relative adjustment, that enable quick and ready attachment and detachment of the parts. There are a substantially unlimited variety of adjusted positions, yet there is a firm, reliable and rigid connection in the desired position.

PRODUCTION EMBODIMENTS OF THE HARDWARE, INSTRUMENTS, ACCESSORIES AND METHOD

Figure 8:
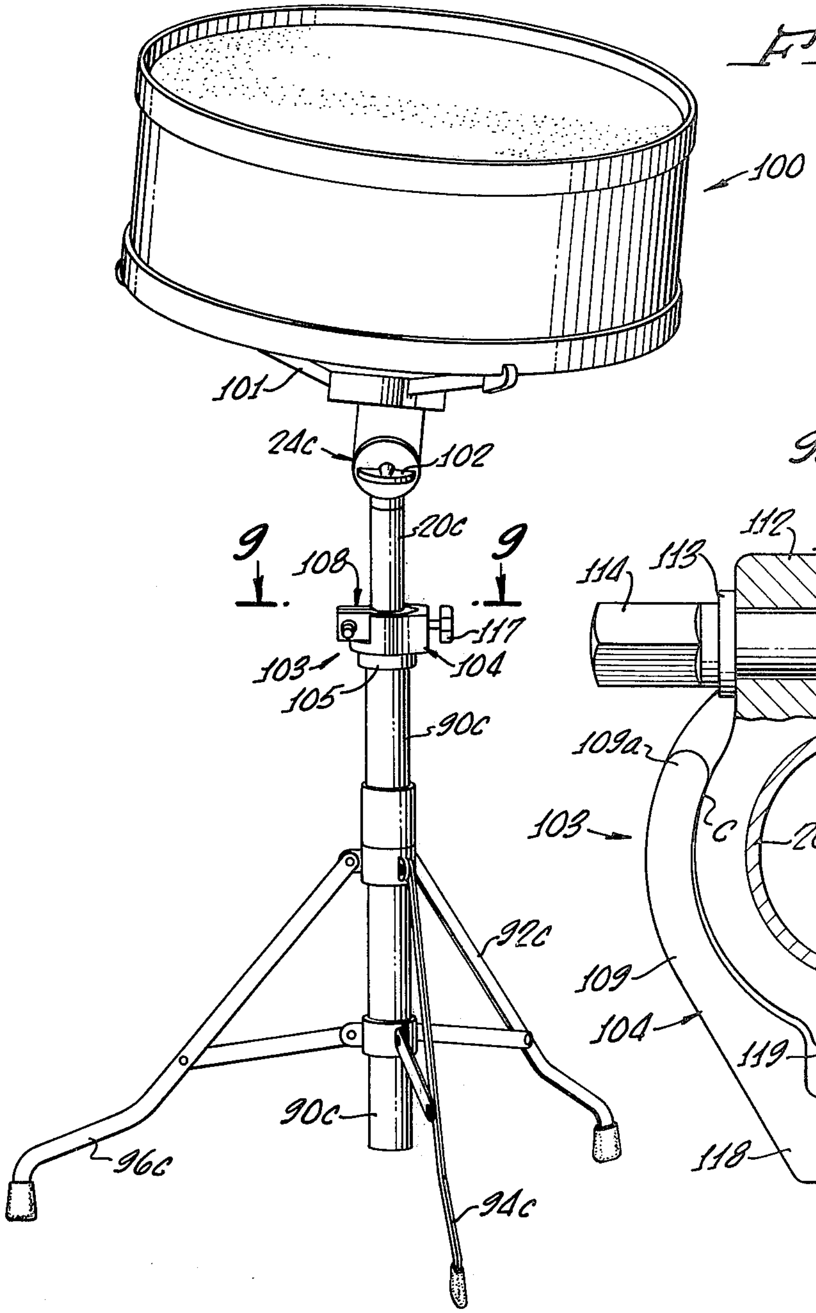
FIG. 8 is a perspective view of a drum stand incorporating the present invention.

At the time of filing this continuation-in-part application, the preferred, production models are those shown and described relative to FIGS. 8, et seq.

Drum Stand

There will first be described the production-model drum stand of FIGS. 8, 9 and 9a. It is emphasized, however, that the production-model connector hardware described relative to such FIGS. 8, 9 and 9a (and also relative to FIGS. 26—27) is also incorporated in the production model of the drummer's throne described above in relation to FIGS. 5-7.

In FIG. 8, a snare drum 100 or other percussive musical instrument is connected to suitable mounting means 101 (preferably an adjustable 3-armed connector bracket) which in turn is lockably pivotally mounted at the upper end of tube 20c. The pivot means in shown at 24c and is preferably similar to element 24 shown in FIG. 1. By first loosening a nut screw 102, snare drum 100 may be tilted to any desired angle about a predetermined horizontal axis, and then locked there upon retightening of the nut screw. The locking is positive because engaged faces of the pivot means 24c are deeply serrated ("ratcheted").

As in the case of other embodiments, tube 20c is a relatively close but sliding fit in the tube or standard 90c. The degree of telescoping, and the relative rotated positions, are determined by the connector hardware 103 which is best shown in FIGS. 9, 9a, 26 and 27.

The receiver 104 of the hardware 103 is mounted rigidly at the upper end of tube 90c in the manner described below. The tubular depending section 105 of the receiver is integral at its upper end with a horizontal wall 106 which extends continuously, clear around tube 90c. Such wall 106 also extends (necks-down) radially-inwardly over the upper end of the tube 90c, as shown in FIG. 9a, having a central opening for sliding reception of tube 20c. The shape and size of such central opening correspond to the inner shape and size of tube 90c. The upper surface of wall 106 is the clamp seat.

Portions of wall 106 are integral with the side walls 107, 109 of the receiver, whereas other portions of wall 106 extend below the gap between the ends of such side walls, reference being also made to FIG. 12. The outer diameter of wall 106 is substantially greater than that of tubular portion 105.

The receiver is extremely strong about the full 360 degrees, for very rigid containment therein of the upper end of tube 90*c*. Such upper-tube end is vertically serrated, in the manner shown at 84 in FIG. 4. It is then tightly press-fit into tubular section 105 until it seats on the necked-down region of horizontal wall 106. No weld, braze, solder, adhesive, etc., is required, yet the connection is secure and rigid as stated above.

Figure 9:
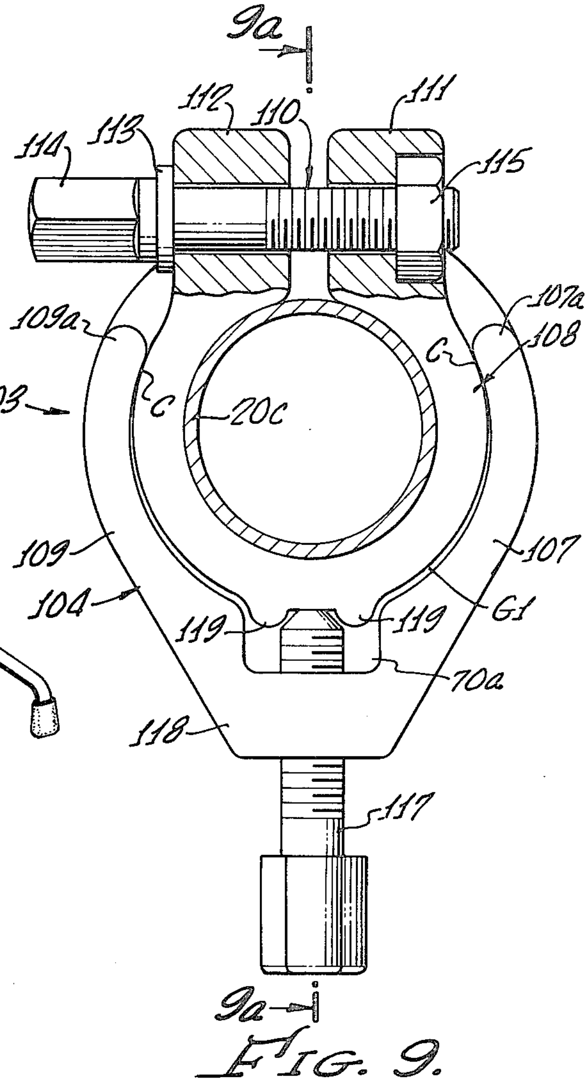
FIG. 9 is an enlarged transverse section on line 9—9 of FIG. 8.

The clamp 108 of the connector hardware 103 is locked onto tube 20*c*; at a desired rotated and axial position, by tightening a pull set screw 110 which extends through lugs 111–112 of the clamp as best shown in FIG. 9. Element 110 has a flange 113 adjacent its square head 114, and also has a section adapted to rotate freely in an unthreaded bore in lug 112. The remainder of the set screw 110 is threaded, being threaded into a hexagonal nut 115 which is seated in a complementary hexagonal recess in the portion of lug 111 remote from the head 114.

Thus, turning of head 114 by a drum key, in the appropriate direction, will draw lugs 111–112 towards each other, whereas turning in the reverse direction will permit the lugs to move apart due to the resilience or spring in the metal.

Again referring to FIGS. 9 and 9*a*, a clamp, set or lock screw 117, preferably of the illustrated wing type, is threaded radially inwardly through an internally-threaded bore in a relatively thick intermediate body section 118 of the receiver. At its inner end, screw 117 is generally frustoconical and seats in a vertical groove or socket between two rounded vertical beads 119 formed integrally on clamp 108.

The diameter of the inner screw end, and other factors, are such that tightening of screw 117 assures that there will be no wobble between the interconnected and interlocked receiver and clamp. The set screw also prevents withdrawal of the clamp from the receiver, so that tubes 20*c* and 90*c* are effectively prevented from moving either axially or rotationally relative to each other. Set screw 117 is further described relative to FIG. 27.

Rotational movement is further prevented by the beads 119 which act as keys, and by the projecting lugs 111–112 which can interact with the adjacent ends of walls 107 at 109. Beads 119 are received in keyway 70*a* (FIG. 9) formed in receiver section 118.

Figure 9A:
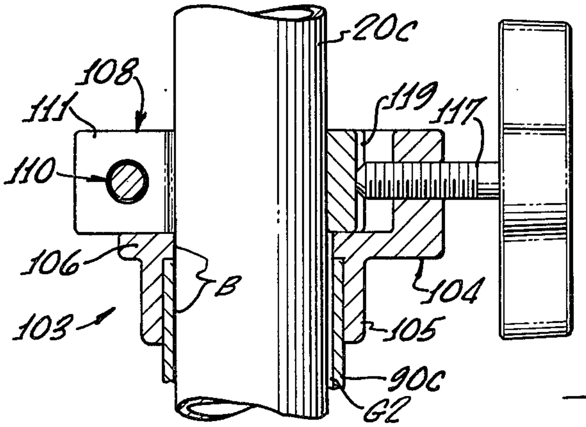
FIG. 9a is a vertical section on line 9a–9a of FIG. 9.

In order to achieve, in two ways ("factors"), surprising prelocking and double-locking actions described in detail below, substantial radial clearance is provided between tubes 20*c* and 90*c* (FIG. 9*a*). Such radial clearance is also provided in other embodiments, for example, that of FIG. 19.

Other important factors relative to the clamp means 108, the tube 20*c*, the set screw 117, etc., are described hereinafter, subsequent to the sub-head which reads "Description of FIG. 26". The great importance of repeatable tilt and orientation of the drum 100, and the major importance of absence of creep and other movements caused by pounding on the drum, are also emphasized elsewhere.

Hi-Hat

Figure 10:
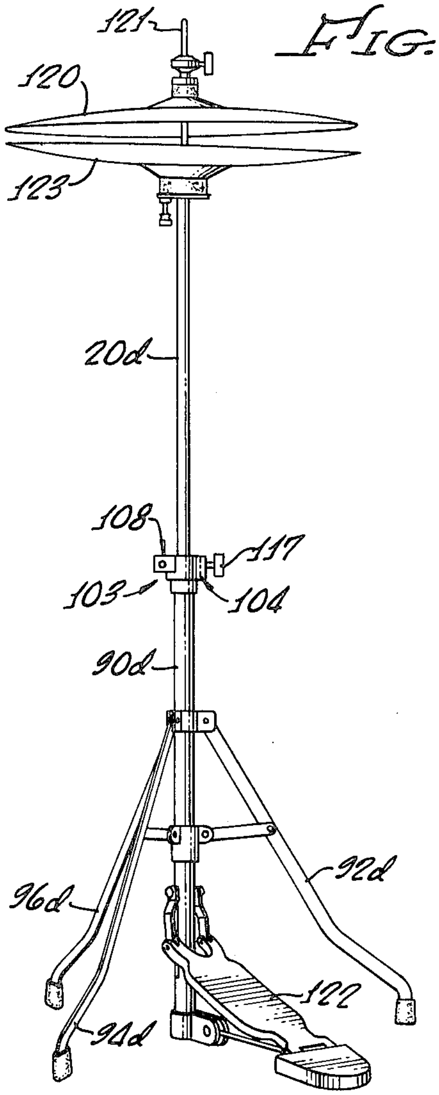
FIG. 10 is a perspective view of a hi-hat incorporating the present invention.
Figure 11:
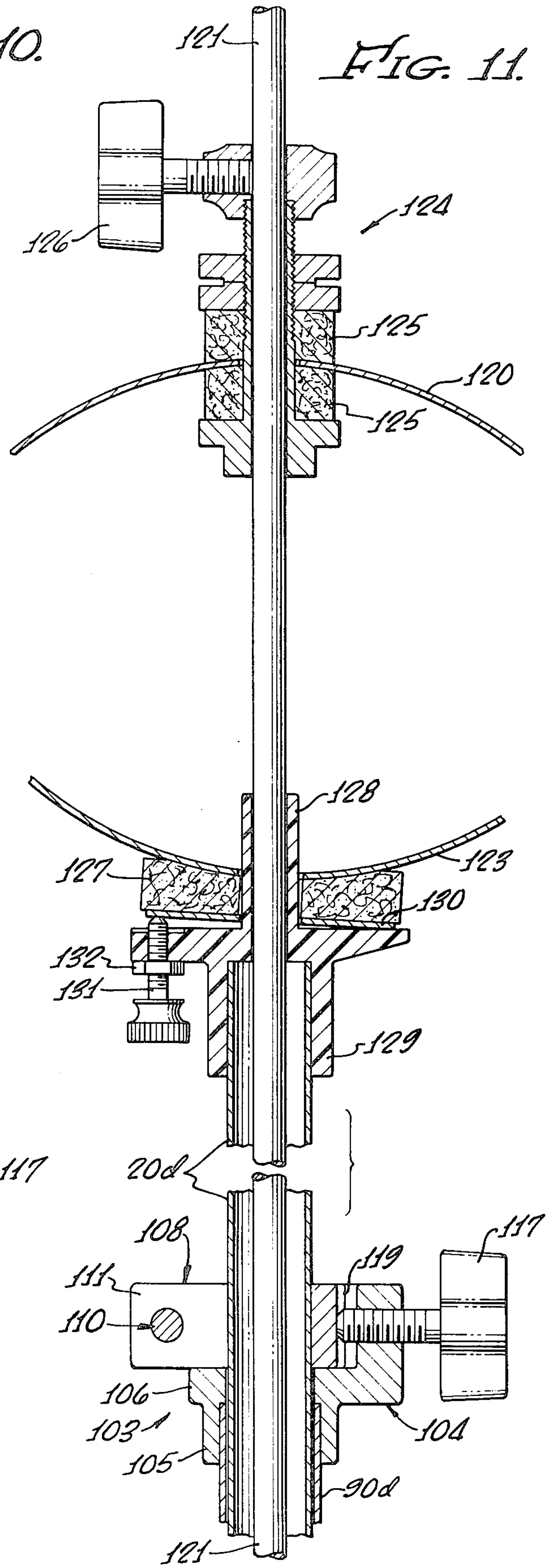
FIG. 11 is an enlarged fragmentary vertical section of the upper and central portions of the hi-hat.
Figure 12:
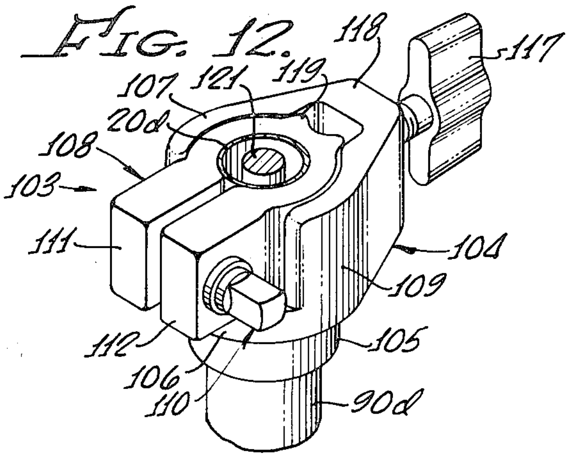
FIG. 12 is a perspective view of a lower portion of FIG. 11.

Referring next to FIGS. 10–12, the connector hardware is incorporated in a foot-operated cymbal instrument known as a hi-hat. Except as stated below, the hi-hat is substantially identical to the one disclosed in U.S. Pat. No. 3,548,068, for a Foot-Operated Percussion Musical Instrument. Said patent is hereby incorporated by reference herein.

The numbering of the connector hardware and leg portions of the hi-hat corresponds to that of FIGS. 8–9, the correspondingly-numbered parts being substantially identical to each other. In FIGS. 10-12, however, some of the numbers are followed by the letter "d" instead of "c".

Stated generally, the hi-hat comprises an upper cymbal 120 which is mounted on a pull rod 121, the latter being connected to a foot pedal assembly 122. Operation of the pedal causes upper cymbal 120 to move up and down so that it percusses relative to a substantially stationary lower cymbal 123.

The mounting of upper cymbal 120 on pull rod 121 is at any desired elevation, being effected by a clutch assembly 124 (FIG. 11) which includes felt washers 125, and which is slidable up and down the pull rod except when a wing set screw 126 is tightened to lock the upper cymbal in place.

The lower cymbal 124 seats on a felt washer 127 which encompasses a neck portion 128 of a base element 129 preferably made of plastic. Such base element is press-fit or otherwise fixedly secured over the upper end of tube 20*d*.

Base element 129 has a radial upper surface over which is mounted a tilt-washer 130. The inclination of the tilt-washer, and thus of the felt washer 127 and lower cymbal 123 supported thereon, is adjusted by means of a vertical adjustment or set screw 131 which is threaded through the base element. A lock nut 132 may be used to ensure that the degree of tilt will not be changed unintentionally.

The tube 20*d* is connected to (telescopically within) tube or standard 90*d* at any desired elevation and rotated position, by the hardware 103 described in detail relative to FIGS. 9, 9*a*, 26, etc. The pull rod 121 extends coaxially through both tubes 20*d* and 90*d*, from the upper cymbal 120 to foot pedal assembly 122.

The height of the upper cymbal 120 is readily adjusted by means of clutch 124 and its set screw 126 (FIG. 11). The height of lower cymbal 123 is readily adjusted by means of the hardware 103, as is the rotated position of the tilted lower cymbal. The importance and manner of duplicating the position and orientation of the tilted lower cymbal are discussed below.

It is emphasized that, just as drum stand hardware 103 of FIG. 8 must withstand much pounding and vibration—without slip or creep—so must the hi-hat hardward 103 of FIG. 10. The upper cymbal 120 is repeatedly slammed down on lower cymbal 123 by foot pedal 122, and this pounding and vibration are all absorbed by tube 20*d* and thus by hardware 103. There must be no creep.

Tom-Tom

Figure 13:
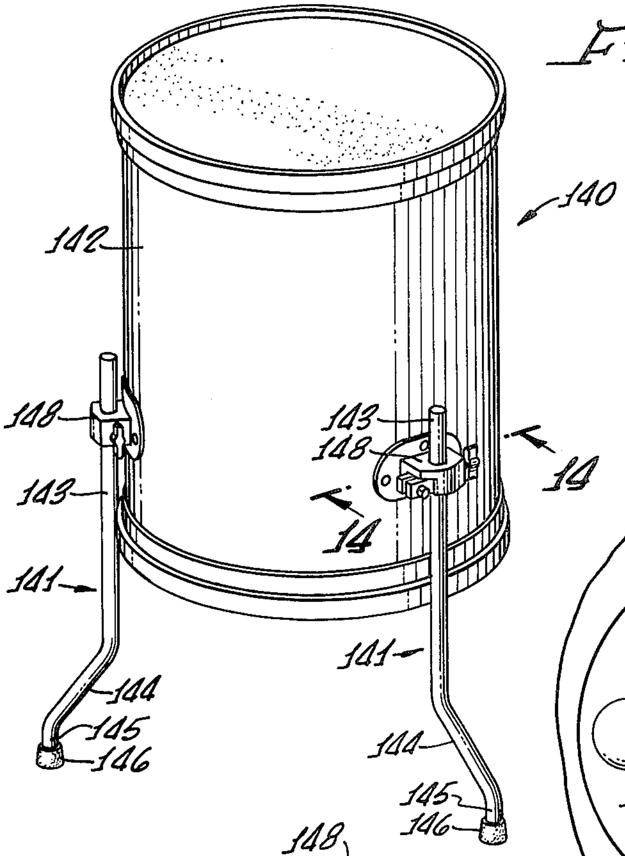
FIG. 13 is a perspective view of a tom-tom incorporating the present invention.
Figure 14:
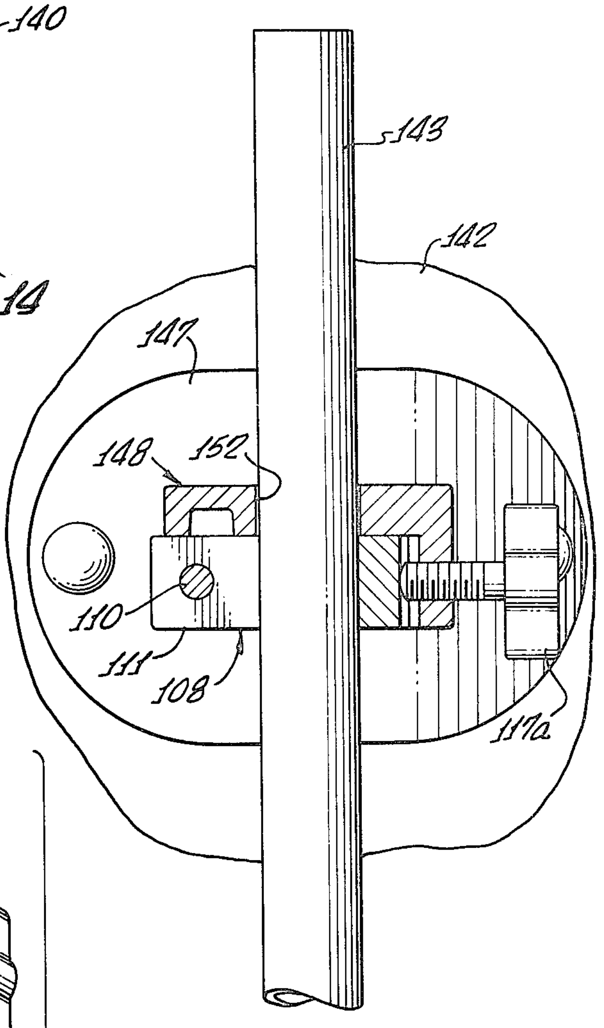
FIG. 14 is an enlarged vertical section on line 14—14 of FIG. 13.
Figure 15:
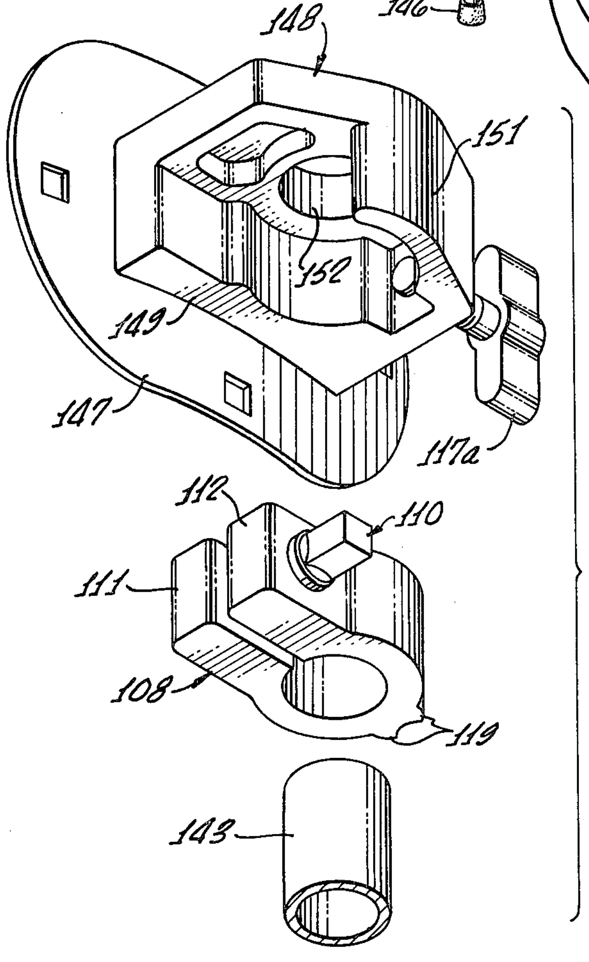
FIG. 15 is an exploded perspective view of a connector portion of the tom-tom.

Referring next to FIGS. 13–15, a relatively large tom-tom 140 (sometimes called a floor-tom) has three legs 141 so that it may be mounted directly on the floor. Legs 141 are preferably spaced at 120 degree intervals about the circumference of the shell 142 of the tom-tom. Each of the legs 141 has a vertical portion 143, an outwardly-inclined portion 144 at the lower end of the vertical portion, a second vertical portion 145 at the lower end of the outwardly-inclined portion, and a foot pad 146 on portion 145.

The inclined portions 144 normally extend radially outwardly, giving the tom-tom 140 much greater stability. It is, however, emphasized that in some "set-ups" or "traps" at least one of the legs 141 must be rotated in such manner that its inclined portion 144 does not extend radially outwardly, since such an extension would create interference with another portion of the set-up.

The connector hardware for connecting each leg portion 143 to shell 142 is identical for each leg 141. Therefore, only one such set of connector hardware will be described and with particular reference to FIGS. 14–15.

A mounting plate 147 is integral with or connected to a receiver 148 which opens downwardly. Thus, one side wall 149 of the receiver is connected to or integral with plate 147, whereas the opposed side wall 151 is spaced outwardly away from wall 149 and has a considerably smaller size, thereby providing room for the head of pull set screw 110 which was described in connection with FIG. 9.

The upper (horizontal) wall of the downwardly-opening receiver 148 has a circular opening 152 to slidably receive leg portion 143.

The same clamp 108, which was described relative to FIGS. 9—9*a*, is employed and is clamped around the leg portion 143 by tightening of set screw 110. As best shown in FIG. 14, the clamp 108 seats in receiver 148, with a part of leg portion 143 extending upwardly through opening 152.

Portions of the side walls 149 and 151 of the receiver are shaped to receive the circular body section of the clamp. Other receiver portions are open so as to receive the clamp lugs 111 and 112, whereas an opposed receiver portion is vertically grooved to form a keyway which receives beads 119.

Thus, when the pull set screw 110 is tightened, and the clamp screw 117*a* (which is threaded through receiver 148 at the vertical keyway in the receiver body) is tightened, the associated leg portion 143 and the entire leg are properly oriented both vertically and rotationally as desired.

Cymbal Stand

Figure 16:
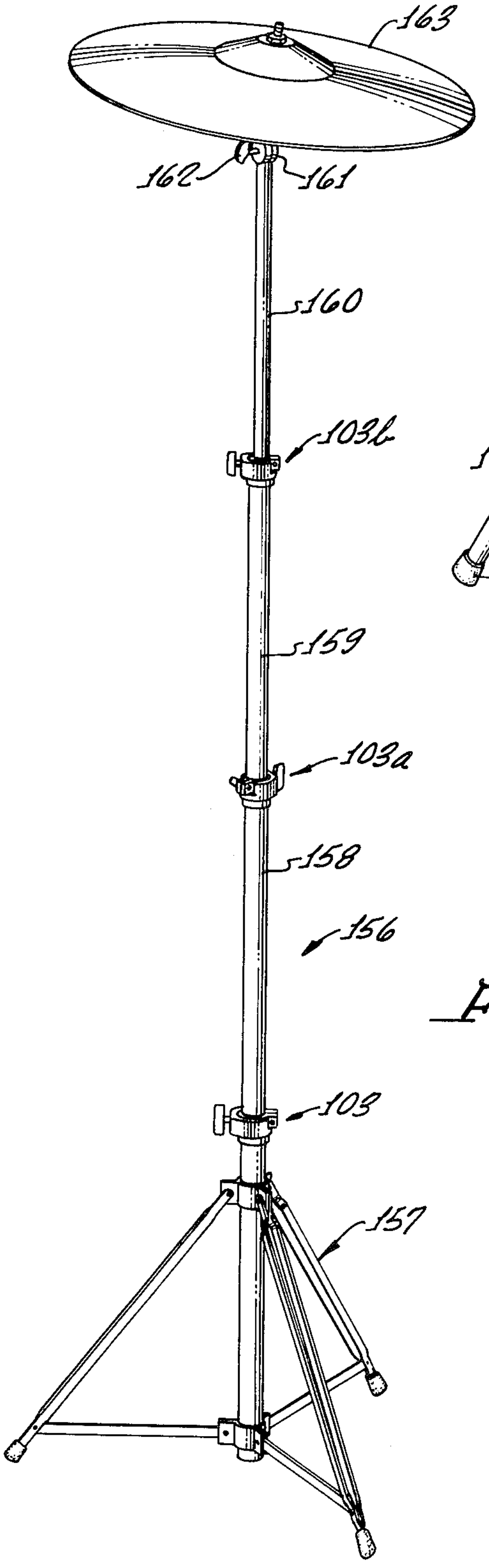
FIG. 16 is a perspective view of a cymbal stand incorporating the present invention.

Referring next to FIG. 16, a cymbal stand 156 is shown as having a collapsible tripod base 157. At the upper end of the vertical tubular standard of base 157 is a set of the present connector hardware 103, which was described relative to FIGS. 8, 9 and 9*a*. Such connector hardware 103 connects the tripod base 157 with a vertical tube 158. Such tube 158 is telescoped partially within the indicated tubular standard.

At the upper end of tube 158 is a second set of connector hardware, indicated at 103*a* and being the same as hardware 103 except smaller in size. Such hardware 103*a* connects to an even smaller tube 159 and this, in turn, connects through a still smaller set of hardware 103*b* to a yet-smaller tube 160.

At the upper end of tube 160 is a pivot mount 161 (which is preferably similar to element 24, FIG. 1) adapted to be adjusted to any pivoted position upon loosening of a clamp screw 162. A cymbal 163 is mounted above the assembly 162 by a means of a suitable felt washer, screw, etc. The cymbal mount may, if desired, be similar to what is shown at the upper end of FIG. 11.

The manner of set-up, and the importance of relative rotational positions of the parts, are described below.

Bass Drum Spur Assemblies

Referring next to FIGS. 17 and 18, which are to be considered in conjunction with the above-described elements 12 and 16 of FIG. 1, there is shown the spur (short leg) assemblies for the base drum 10*a*. FIGS. 17 and 18 depict the production models of the spur assemblies. Unlike FIG. 1, FIG. 17 shows (with heads removed) the bass drum side which is remote from the seated drummer.

The two spurs or short legs are indicated at 166 and 167, each being adapted to either have a rubber cup 168 at the end thereof to bite directly into the carpet or flooring in order to minimize the possibility of sliding. For such biting purposes, the outermost ends of spurs 166 are provided with sharp corners 169 as shown in FIG. 18.

A clamp 108 is mounted on each spur 166–167, such clamp being constructed as described above relative to FIGS. 8, 9, 9*a* and 26. The clamp and the inner end of each spur fit into and/or (in the case of the spur end) through a receiver element 171 mounted on the shell 14*a* of drum 10*a*. Each such receiver is preferably relatively remote from the drummer (namely, farther from the batter head than from the front side of the drum).

It is emphasized that, unlike spurs 12 shown in FIG. 1, spurs 166 and 167 are not straight but instead bend obliquely at regions relatively adjacent their outer ends. This provides improved floor contact, with minimum creep, when proper rotational and axial adjustments are made as stated hereinafter.

Figure 19:
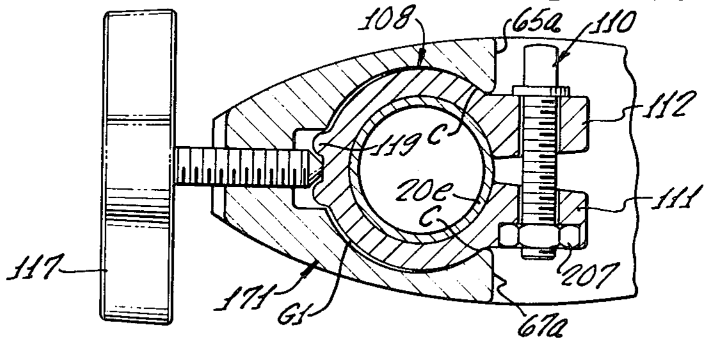
FIG. 19 is a view corresponding to the left part of FIG. 3 but showing the preferred embodiment.

The combination of the clamp 108 and receiver 171, of the production embodiment, are shown in section in FIG. 19. It is pointed out that FIG. 19 is relatively small in scale, and that the much larger-scale FIG. 9 (even though FIG. 9 shows a form not adapted for mounting on a drum shell) more clearly shows the shapes of and relationships between the engaged portions of the clamp 108 and its associated receiver. Each receiver 171 is substantially identical to the receiver 38 shown in FIGS. 2–4, except that its construction in regions adjacent clamp 108 are as shown in FIGS. 19, 9 and 9*a*.

The clamp 108 is the same as described above and also relative to FIG. 26 (the tube region on which the clamp seats being also constructed as described below relative to FIG. 26).

All three receivers 171 shown in FIG. 17 (two for the spurs, and one—or more—for associated drums and other accessories) are preferably identical to each other. The upper receiver 171 receives the top end of a brace tube 42*a*, as described relative to brace tube 42, FIG. 2.

Figure 20:
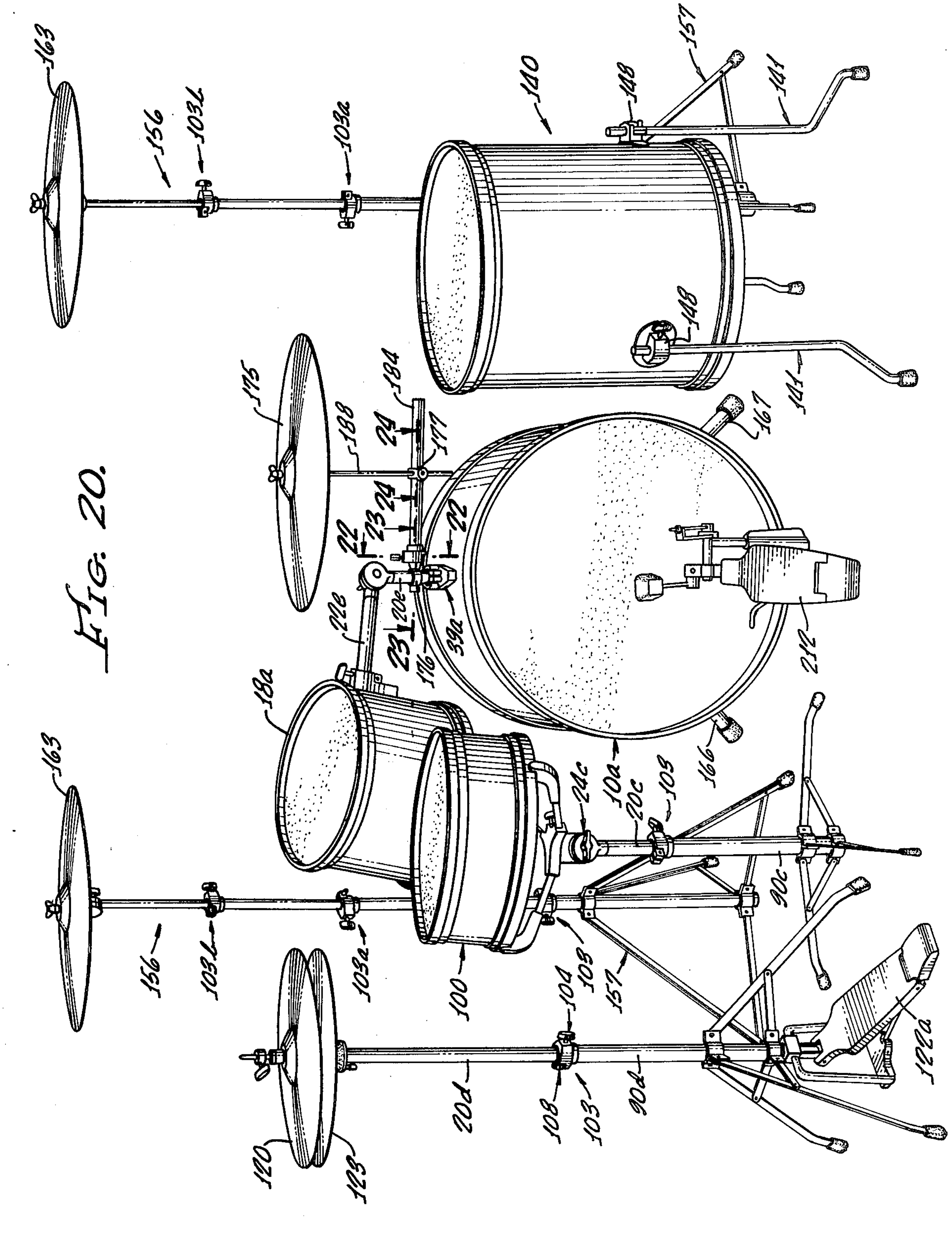
FIG. 20 is a perspective view of one of various drum outfits or traps incorporating the present invention.

Description of FIG. 20

FIG. 20 shows one of numerous types of outfits, traps or set-ups which may be made with the connectors, instruments and accessories of the present invention. The various instruments, hardware and accessories illustrated are shown and described in detail elsewhere in this specification. The outfit depicted in FIG. 20 is as seen from the drummer's side, not the audience or remote side thereof. (There is not shown in FIG. 20 the throne or stool which is described in detail relative to FIGS. 5–7, 9, 9*a* and 26.)

Only one tom-tom, number 18*a* and being the production-model of what is shown in FIG. 1, is illustrated as mounted on the bass drum 10*a*. It is emphasized, however, that some drum outfits have three (or two) tom-toms mounted on and above the bass drum 10*a*, for example, on "triple-tom" holder hardware. The tom-tom 18*a* is shown on the opposite side from tom-tom 18

(FIG. 1), either such positioning being easy to achieve with the present invention.

There are numerous combinations of instruments which may be employed, some with four or five tom-toms, two bass drums, etc., etc. Vast numbers of set-ups may be made with only a relatively small dealer's stock of components. An additional major advantage is that only a few standard holes (and also associated hardware) in drum shells can be used to generate wide varieties (and complexities) of outfits.

The larger the number of individual instruments and accessories, and/or the less tall the drummer, the closer the various instruments and accessories must be nested or "packed" relative to each other in order to be highly accessible by a single (seated) drummer. This means that the different legs of the various stands, etc., must be intermeshed, overlapped, etc., in predetermined ways or the instruments will not "fit" together properly.

It is also emphasized that various snare drums, tom-toms, cymbals, the lower hi-hat cymbal, etc., are located and tilted in predetermined ways as desired by the particular drummer. Once the drummer gets his outfit or set-up or set of traps properly arranged, he wants to be able to rapidly reproduce this exact set-up in different locations and on different nights. All of the various instruments combined, for the particular drummer, form his own single, particular "instrument". Heretofore, however, each drummer has been forced to play different instruments on different nights since the set-ups were almost never exactly the same.

It is now possible for the drummer to rapidly and easily achieve the same exact "instrument" or set-up, with all angles, tilts, locations, etc., being the same, place after place and night after night. The method of achieving this particular combined "instrument", is described subsequently under headings relating to methods of initial set-up and subsequent set-ups.

The Combination (Compound) Clamp Assembly

Referring again to FIG. 20, and also to FIGS. 21–24, there is shown a cymbal (or other instrument or accessory) 175 which is mounted on bass drum 10*a* along with the illustrated tom-tom 18*a*. The cymbal 175 is readily mounted on the same vertical tube (number 20 in FIG. 1, number 20*e* in FIG. 20) which supports the tom-tom 18*a*. This is accomplished by means of two combination or compound clamps 176 and 177 each of which is constructed as shown in perspective in FIG. 21. (However, the clamp associated with the vertical tube 20*e* need not be drilled as illustrated at the right in FIG. 21).

The combination clamps 176 and 177 each comprise a main clamp portion 178 which is substantially identical to clamp 108 described above relative to FIG. 9, etc., but does not have as much clamping ability for reasons stated both above and below. Extending outwardly from the generally tubular body of main clamp portion 178, diametrically opposite the lugs 111–112 thereof, is a generally cylindrical side connector 179. More specifically, connector 179 is integrally connected to clamp portion 178 through an integral web 180. The combination of a main clamp portion and side connector may be referred to as a "compound clamp".

The side connector 179 has a concentric, generally cylindrical necked-down end portion 181 on the portion thereof remote from main clamp portion 178. Such end portion operates, as does the clamped tube in previously-described hardware, to provide stability and minimize wobble.

The common axis of elements 179 and 181 is perpendicular to, and intersects, the axis of clamp portion 178.

A key portion 182 is formed on one side of the connector 179, and has a recess or shallow hole 183 therein for reception of the inner end of a lock (set) screw 117. Each combination clamp 176 and 177 is preferably an integral die-casting of aluminum.

Referring to FIGS. 22 and 23, the combination clamp 176 on the vertical tube 20*e* which projects upwardly out of drum 10*a* has its main clamp portion 178 locked onto such vertical tube by tightening of the pull set screw 110. There is then connected to such combination clamp 176 a receiver 104 of the type described relative to FIG. 9, etc., which receiver is connected (as by press-fitting, described above) to a horizontal tube 184.

The lock (set) screw 117 in the receiver 104 is tightened so that its end enters the recess 183 and creates a tight clamping relationship. It is emphasized that the necked-down portion 181 has an outer diameter sized to fit snugly within the circular aperture in wall 106 (lower portion of FIG. 9*a*), and also snugly into tube 184, so that much stability is imparted to the connection.

In the described manner, therefore, the tube 184 is caused to project sideways from the vertical tube 20*e* and in a predetermined rotated position. Such rotated position is determined by the key 182 and its associated keyway, screw, etc., in receiver 104.

The second compound clamp, number 177, is (as shown in FIG. 24) clamped onto the horizontal tube 184 by tightening set screw 110. The generally cylindrical portion 179 of the clamp 177 is transversely drilled at 185 to receive a rod 188 having the cymbal 175 mounted at the upper end thereof. To lock the rod 188 against vertical movement, a set screw (adapted to be operated by a drum key) 189 is extended into an internally-threaded axial bore 190 in portions 179,181 of the clamp.

It will thus be seen, relative to the two clamps 176 and 177, that one is used to connect to a combination tube and receiver, and that the other is used (with no receiver) as a connector between the tube and a musical instrument or accessory (in this case, a cymbal).

It is to be noted that the web 180 of each combination clamp 176–177 produces the undesirable result of reducing the amount of flexibility of the main (tubular) clamp portion 178.

As previously described, it is highly desirable (where great strength is required) that such main clamp portion be relatively flexible throughout its entire circumference, for more uniform and thus better gripping action on the associated tube. However, in some instances (as here) when there is not to be great pressure on the instrument, since the cymbal 175 (for example) does not create great pressure when tapped by a drumstick, the main clamp portion 178 has adequate strength despite the fact that full flexibility is not achieved in such construction. This is particularly true when the tube, on which the clamp is mounted, is constructed as described below relative to FIG. 26.

Drum Carrier Assembly For Marching Drums

There is shown in FIG. 25 a drum carrier for marching drums, wherein three such drums 191–193 are each connected by means of the above-described hardware (that described relative to FIG. 19, etc.) to three tubes 196–198 which are mounted on a carrier 199. Carrier 199 has portions 201–202 adapted to fit over the shoulders of the marching drummer, and waist portions 203–204 adapted to fit generally around the waist of the drummer (there being belts, etc., as illustrated).

The connection of each tube 196–198 to the carrier 199 is by means of a lockable pivot mount, one of which is shown at 206, so that the inclination of each drum may be adjusted as desired. Pivoting of tubes 196–198, when the mounts are loosened, is about vertical axes.

Because of the connections between the tubes 196–198 and drums 191–193, each such drum may be demounted and remounted without changing its position relative to the carrier, either rotationally or axially.

Description of FIG. 26

One of the described clamps 108 (FIG. 9, etc.) is clamped onto a tube (for example, tube 20*b* of FIGS. 5 and 26). Tube 20*b* is to be understood as representative of all the tubes described above. The clamping is effected, as stated, by the pull set screw 110 which threads into nut 115. In all embodiments, the pull set screw is turned by a drum key such as the one shown at 207 in FIG. 26.

It has been discovered that the combination of the clamp and tube is economical to manufacture yet has a slippage-resistance (both axially and rotationally) far above even that anticipated by the inventors. To maximize such slippage-resistance, and achieve surprisingly great frictional locking characteristics, the following constructions are employed.

The tube 20*b* is formed of steel, and has an exterior surface which is roughened by impingement thereagainst of particulate material such as sand or shot (preferably shot). Stated otherwise, the exterior surface of tube 20*b* is sand-blasted or shot-peened, preferably the latter. Such roughening by sand blasting or shot-peening is relatively inexpensive and, furthermore, creates a highly decorative surface. Preferably, the roughened surface is covered by a thin layer of chromium, by chrome plating.

The roughened surface of the tube is represented by stippling in FIG. 26.

The clamp 108 is formed by die-casting a relatively soft metal, preferably aluminum, and then drilling or reaming the interior thereof in order to make the interior surface cylindrical except at the gap between lugs 111–112. (The as-cast inner clamp surface is not a perfect cylinder because of the taper or draft inherent in the die-casting process.) The diameter of the interior clamp surface is slightly larger than the external diameter of the tube 20*b*, prior to the time the clamp is tightened. Zinc, another non-ferrous metal, may also (but less preferably) be used.

The interior surface of the clamp, and the exterior surface of the tube 20*b*, are in close "flatwise" engagement with each other—after the clamp is tightened—from the upper region of the clamp (right side of FIG. 26) to the lower region thereof, and for the full clamp circumference except at the gap between the lugs. Thus, after the described clamp-tube assembly is locked by the drum key (by use of the hand of the operator and without need for any wrenches or other tools), the resistance to slippage, vibration, and pounding is surprisingly high. For example, and relative to the stool or throne embodiment of FIG. 5, a drummer weighing in excess of 200 pounds and sitting with both feet off the ground much of the time—with much bouncing and pivoting action in his body—will not create sliding of the tube 20*b* relative to the lower tube or standard 90.

As another illustration, and relative to the embodiment of FIG. 1 (modified as described relative to FIG. 26, etc.) but wherein there is a second arm 22 (but extending horizontally in the opposite direction) so as to provide hand grip regions on both sides of the vertical axis of tube 20, a gymnast of average weight may place his full weight on the tube 20, and do a handstand, without creating slippage.

Relative to the hi-hat embodiment of FIG. 10, a drummer employing foot pedal 122 to pound the upper cymbal 120 down on lower cymbal 123 (and thus pound tube 20*d*) hundreds or thousands of times per evening will not create slippage at the hardware 103.

All of the above are very surprising consequences, especially when considered along with the economy of manufacture, the utility of the finished product, the ability to be unlocked and later locked in the same position, etc.

It is a feature of the assembly that the clamp will spring apart when the pull set screw is loosened, there being no necessity for any forcing-apart action.

Method of Initial Set-Up of a Drum Outfit (Traps) Which Has Never Been Played

Let it be assumed that a drummer has just purchased, from a music store, boxes containing various ones of the musical instruments and accessories previously described. He then has the task of constructing his own particular "instrument", namely the entire assemblage or outfit of drums, etc. (one example being shown in FIG. 20). It is emphasized that each location, each inclination, each elevation, etc., is individualized in a manner important to the particular drummer. He wants to "construct" the outfit to suit his own taste, and once it is initially constructed, he wants to be able to rapidly reproduce it night after night in the same or different locations—with accuracy and with a minimum of trouble.

The drummer usually starts with the bass drum 10*a* (FIGS. 17 and 20), which arrives assembled with tube 42*a* and receivers 171 but not with spurs 166–167.

A clamp 108 (FIG. 18) is placed on each of spurs 166–167. The spurs are then introduced, as far as the drummer intends or desires, into the two lower receivers 171 on shell 14*a*. Furthermore, the clamps 108 are caused to be fully seated in the respective receivers. The screws 117 are then at least partially tightened to prelock both the clamps and their associated spurs in place, as discussed under the following subhead "PRE-LOCKING AND DOUBLE LOCKING."

When the drummer is fully satisfied with the symmetry and height of his adjustment, the spurs being properly oriented both axially and rotationally, he tightens the set screws 117 hard (FIGS. 18, 19 and 27).

The inner end of each screw 117 then makes its own small recess or socket in the aluminum clamp 108 at a region between beads 119. For the stated purpose, each screw 117 is of a known type (formed of steel) wherein the frustoconical inner end is provided with knurls or serrations for cutting into the object engaged. Such serrations are indicated at 210 in FIG. 27. Because each screw 117 is formed of steel, because of the presence of these serrations 210, and because the clamp 108 is formed of a soft metal (softer than steel) such as (preferably) aluminum as described above, the clamp screw forms its own recess as indicated and this predetermines the exact location of the clamp in the receiver for each and every subsequent assembly of the drum spurs to the drum. Furthermore, the mounting is very tight, free from wobble, etc.

A drum beater assembly, indicated at 212 in FIG. 20, is mounted by the musician to the rim or counterhoop of bass drum 10*a* (preferably before the described mounting of the spurs). This assembly, which includes a foot pedal, a beater and associated linkage, is clamped to the rim of the drum 14*a* on the side relatively remote from the spurs. The spurs and the foot pedal or beater assembly 212 provide a three-point support for the drum. For a typical drum beater assembly, reference is made to U.S. Pat. No. 3,030,847.

Assuming that the particular outfit being set up ("constructed") is the one shown in FIG. 20, the next step in the initial assembly procedure is to mount a compound clamp 176 (FIG. 21) on tube 20*e* by relatively loose tightening of pull set screw 110. Thereafter, a clamp 108 is placed on the lower portion of tube 20*e* by sliding the clamp upwardly from the lower tube end.

PRE-LOCKING AND DOUBLE-LOCKING

The last-mentioned placing is executed without any tightening of the pull set screw 110 for clamp 108, the drummer instead dropping the tube 20*e* into the uppermost receiver 171 (FIGS. 17 and 19) until the pivot hardware (corresponding to hardware 24, FIG. 1) is at approximately the desired elevation above the bass drum shell. Then, a substantial (but not final) "locking" action is achieved by partially tightening only the screw 117 (FIG. 19).

It has been found, surprisingly, that a low-torque tightening of only the lock screw 117, in the absence of any tightening of the pull set screw 110, effects a clamping or prelocking action whereby the connected tubes 20*e* and 22*e* (FIG. 20) will stay in the desired axial and rotational positions until adjustments are made by the drummer. In this way, therefore, the burdensome necessity of repetitively tightening and loosening any pull set screws 110 during initial set-up of the drum outfit is eliminated.

The described pre-locking action is caused by two factors, one being that the pressing of the clamp screw 117 into clamp 108 creates a slight degree of inclination or "cocking" of the vertical tube 20*e*, so that it binds with portions of the receiver 171 and the elements 74 and 42*a* therebeneath (FIGS. 2 and 17).

The "cocking" action described in the preceding paragraph makes effective use of slight gaps between the clamp and receiver elements, and between the telescoped tubes. FIG. 9 shows in large scale (relative to the other type of receiver, which operates identically to what is here described) how clamp 108 is pushed away by set screw 117, thus causing the tilting, cocking action which effects binding. FIG. 9*a* also shows the results of such pushing-away. The resulting gaps are indicated at G1 and G2 in FIGS. 9, 9*a* and 19.

The gaps shown at G1 and G2 in FIGS. 9, 9*a* and 19 are the results of pushing the tube 20*e* (20*c* in FIGS. 9 and 9*a*) to one side, thus causing the no-gap binding regions at B, FIG. 9*a*. Again, it is pointed out that similar binding regions are present in and below the receiver 171 of FIG. 19.

The second of the two factors which cause pre-locking—upon turning of set screw 117 when pull set screw 110 is loose—is a cam relationship. Referring again to large-scale FIG. 9 when set screw 117 pushes clamp 108 upwardly (as viewed in such FIG. 9), the inwardly-curved wall end portions 109*a* and 107*a* of the receiver push the associated clamp portions towards each other at cam regions C. This causes a certain amount of tightening of the clamp on tube 20*c* (20*e* in FIG. 19) even though pull set screw 110 is loose. The clamp 108 is thereby caused to engage a larger surface area of the contained tube, which is held to the desired extent as determined by the degree of turning of screw 117.

The above description has, as indicated, been made with reference to FIG. 9, even though such figure shows a receiver externally different from that of FIG. 19, because of the larger scale of such FIG. 9. In FIG. 19, the cam regions are also shown at C, being near the wall end portions 65*a* and 67*a*.

As the next step in the initial set-up ("construction" of the individualized percussive instrument), the drummer adjusts the pivot fitting to achieve the desired angular relationship between tubes 20*e* and 22*e*, FIG. 20, which relationship is permanent (unless further adjustment is subsequently desired) due to the meshing action of the serrations (teeth) as described above relative to elements 30–32 in FIG. 1.

The clamp 108 for tom-tom 18*a* is then mounted loosely on the relatively horizontal tube 22*e* shown in FIG. 20, following which the tom-tom is mounted in the approximate desired position. Then, the above-described pre-locking is effected by tightening only the lock (set) screw 117 (FIG. 19) for the hardware associated with the tom-tom 18*a*—without any necessity for tightening the pull set screw.

The drummer then adjusts the tom-tom axially of tube 22*e*, and rotationally (about vertical and transverse axes), until the upper (batter) head thereof has precisely the location and inclination desired. Such adjustment is possible because the gripping action effected by tightening only the lock screw 117 is not caused to be so strong as to prevent both axial sliding and rotation as desired by the drummer—while resisting any movement caused by gravity, etc.

Finally, when the drummer is satisfied that the axial position, angular position, elevation, etc., of the tom-tom 18*a* are as desired, he uses his drum key 207 (FIG. 26) to manually tighten the pull set screws 110 for both the receiver 171 of tom-tom 18*a* and the upper receiver 171 of bass drum 10*a*. Also, he fully tightens lock screw 117.

Tom-tom 18*a* is thus finally mounted in a very rigid manner which will withstand a tremendous amount of beating and vibration. The locking action provided by the mated hardware is double or compound, being the result of (1) the cocking and camming effected by screw 117, and (2) the tight clamping of clamp 108, and (3) the pressure-seating of the screw end 210 (FIG. 27) in the recess it made in clamp 108.

As the next step in the method of initial set-up, the tube 184 for cymbal 175 is mounted into position by positioning the receiver 104 (FIG. 23) at the end thereof over the elements 182—179, and then tightening the lock screw 117 (FIG. 22).

The additional compound clamp 177 (FIG. 24) is then mounted on tube 184, its screw 110 is partially tightened, rod 188 is inserted through aperture 185, and screw 189 is tightened. Then, the cymbal 175 is mounted in position at the upper end of the rod. The elevation, angular position, etc., of the cymbal are adjusted in various ways as by shifting the compound clamp 177 along tube 182, and the compound clamp 176 along the tube 20*e*, and by rotating either clamp about its axis. Then, set screws 110 in the compound clamps are fully tightened.

A mark is then made on rod 188, to show its exact adjusted position relative to clamp 177.

It is emphasized that numerous other elements may be mounted on the bass drum. For example, a triple-tom holder (not shown) may be mounted in the upper receiver 171 in place of the tube 20*e* for tom-tom 18*a* and the cymbal.

Assuming that the large floor-tom 140 (FIGS. 13 and 20) is the next element to be assembled, this is effected by introducing the three legs 141 upwardly through the receivers 148 (FIG. 13), after first mounting clamps 108 on the leg portions 143. As described above, the clamps may be thus mounted without tightening the pull set screws 110, pre-locking being achieved by tightening the lock screws 117*a*. (It is also possible to tighten the pull set screws 110 only partially.)

When the upper surface (batter head) of the tom-tom is (as is usually the case) horizontal, the amount of projection of each leg portion 143 through its receiver 148 being the same, and when the legs 141 are each pivoted to desired positions about the vertical axis, the pull set screws 110 are fully tightened.

It might be thought that the rotational position of each of the floor-tom legs 141 about the vertical axis would always be the same. This is, however, not true since a drummer may wish to pivot at least one of the legs about the vertical axis until the inclined portion 144 does not project radially outwardly. Instead, the rotative position about the vertical axis may be such that the inclined portion projects generally circumferentially (or only partially outwardly) of the tom-tom. This is done in order that the leg portions 144, 145 and 146 will not interfere with the location of another portion of the set-up or outfit.

Proceeding next to a description of initial set-up of the snare drum 100 and its stand, FIGS. 8 and 20, the tripod base is first opened to a desired degree and a clamp screw (not shown) is tightened to maintain the tripod base thus opened and locked. One of the clamps 108 is then mounted over tube 20*c*, without tightening the pull set screw 110. Tube 20*c* is then introduced downwardly into the standard or large tube 90*c* (FIG. 8) until the snare drum 100 is at approximately the desired height, following which lock screw 117 is partially tightened to achieve the pre-locking action described above.

Prior or subsequent to such initial assembly of elements 20*c* to 90*c*, snare drum 100 is secured on its mounting means 101 and pivoted to the desired inclination by operation of the fitting 24*c*.

The drummer then pivots the snare drum about the vertical axis, and also raises it and lowers it to the precise position desired, by merely manually placing his hands on the snare drum and moving it as desired. The lock screw 117 need not be loosened as it is only partially tight, nor has the pull set screw 110 ever been tightened at this stage. In this way, it is very easy for the drummer to initially construct this portion of his overall percussive instrument (the entire drum outfit).

It is emphasized that the exact orientation of the drum 100 relative to the positions of legs 92*c*, 94*c* and 96*c* (FIG. 8) is of distinct importance in many set-ups, since it is desired that the legs do not interfere with adjacent instruments. For example, as shown in FIG. 20, the legs of the stand for snare drum 100 must not interfere with the legs of the adjacent hi-hat and one of the cymbal stands.

After the precise desired snare drum position is achieved, the pull set screw 110 is tightened and the clamp screw 117 is fully tightened. A double lock is thus obtained which will withstand great amounts of pounding and vibration.

The hi-hat of FIGS. 10–12 is then set up (or the improved hi-hat shown in FIG. 20—having a different construction adjacent the foot pedal—is set up), both the improved hi-hat and the one shown in FIGS. 10–12 having the same hardware elements 104 and 108, etc.

The elevation of tube 20*d* relative to tube 90*d* (FIG. 10) is adjusted by tightening the lock screw 117 initially, after approximate desired axial positions are achieved. The inclination of the lower cymbal 123 is adjusted, as described above, by turning the screw 131 (FIG. 11). The lock nut 132 (FIG. 11) may be employed if desired, but numerous drummers do not do this since they wish to adjust the inclination of the lower cymbal during a performance in order to change the sound of the instrument.

It is emphasized that the degree of tilt of lower cymbal 123 has a distinct bearing on the sound that the hi-hat instrument makes, and that the drummer may wish to change the tilt, using one hand (for example, his left hand) while he continues to play other instruments with his foot and his right hand. Thus, the location of the screw 131 relative to the positions of the hi-hat legs, and relative to the position of the throne (unshown), is significant to many drummers. By "location", in the previous sentence, is meant the circumferential position of screw 131 about the axis of the hi-hat.

It is also emphasized that the elevation of the upper hi-hat cymbal is important to drummers, since such cymbal is often tapped by a drum stick.

After the hi-hat is fully adjusted as desired, the drummer tightens the pull set screw 110, and fully tightens screw 117, to complete the set-up by obtaining the double-lock action of hardware 103.

Each of the two cymbal stands shown in FIGS. 16 and 20 is then adjusted, in such manner that the inclination of the cymbal 163 is as desired. Here again, the inclination of each cymbal 163 is such as to be at a predetermined relationship to the positions of the various legs of the tripod base. Thus, for example, the lower edge region of each cymbal is caused to be above a certain leg, so that (a) this lower edge is nearest the seated drummer, and so that (b) no leg will interfere with adjacent legs or instruments.

In an outfit such as is shown in FIG. 20, where there are two cymbal stands, each receiver element is color-coded relative to its associated clamp, so that the elements of one stand may not be unintentionally interchanged with those of another to thereby upset the precise predetermined relationship of either tilted cymbal to its associated base.

The drummer then assembles the stool or throne, which is not shown in FIG. 20 but is shown in FIGS. 5 and 26, by tightening the pull set screw 110 by means of the drum key 207. (Such pull set screw replaces, in the production model, the clamp means 36*b* shown in FIG. 5). When the height is thus set, even a heavy drummer may support substantially his entire weight on the seat 98, and move his body rhythmically to a great extent as is often done by drummers, without changing the axial position of tube 20*b*.

There has thus been described the initial assembly of one of myriads of outfits ("instrument") which may be "constructed" with the present hardware. So long as the legs of the various individual instruments are in the same positions on the underlying floor as is shown in FIG. 20, the inclinations of the drums, cymbals, etc., will be the same as before, night after night and place after place.

The drummer may, if he desires, remember which legs point in which directions, etc., but this is not precise. For precise reproduction of the overall set-up or "instrument", the drummer may make and use a diagram of the foot positions of the various legs. Alternatively, he may—before setting up his instrument each night—place on the floor a rug or pattern of the non-slip type and which has marked thereon the locations of the various feet of each instrument. When such a pattern is used, or diagram followed, the overall instrument is exactly reproducible with no room for guesswork or approximation. (The "markings" on the rug or pattern may be in the form of holes therein, each hole being cut out by the drummer and adapted to receive a particular foot portion of an instrument leg.)

Re-Assembly On A Different Night Or At A Different Location, After The Initial Set-Up Has Been Made Assume that all of the instruments are packed away in various cases, such as drum cases, "trap cases", etc. Various spurs, beaters, legs, tubes, etc., are disconnected. However, some assemblies (such as tubes 22*e* and 184, with associated clamps 176 and 177, FIG. 20, are maintained intact and not disassembled).

No clamp 108 is disassembled or loosened at any time, unless the drummer decides to make some change in his setup.

Assuming that the drummer has a pattern, he places it on the floor and then starts his set-up. First he mounts the drum beater 212 on the bass drum 10*a*, then mounts the spurs thereon. It is impossible to reverse the spurs since—once the clamps 108 thereon are locked—they are then (for the first time) "left and right" and must be mounted in the same sockets as before.

The various instruments are all set up in the manner described above, except that at no time is any pull set screw 110 loosened or tightened. The only thing which needs to be noted is the vertical position of the rod 188 for the cymbal 175, and this is done (as stated) by means of a mark adjacent the compound clamp 177 on tube 184. A similar mark is used to indicate the height of assembly 124, FIG. 11.

In other words, all the drummer needs to do is introduce the various tubes and clamps into the sockets therefor, and tighten all of the set or clamp screws 117. As above described, the exact previous positions are achieved since the various screws previously made their own small recesses in the clamps (as described above).

Thus, the drummer can assemble his "instrument" in much less time than in prior art structures, yet achieves the same instrument he played the night before and need not continuously make settings, adjustments, etc., before or during the performance.

The strength of the set-up is enormous, and the resistance to vibration and pounding extreme. For example, and as previously indicated, the pounding on the lower cymbal 123 of the hi-hat, which may continue for hundreds or thousands of percussions, does not cause slippage of the tube 20*d* downwardly through the receiver 104 (FIGS. 10 and 11), in a creeping action or any other action. Everything stays locked. The same applies for the floor-tom, the throne, drum stand, etc.

It is a major feature of the present invention that only the minimum number of holes—and these of standard shape—need be made in various drum shells. It is another major feature that the same hardware may be employed for both left-handed and right-handed drummers, without any need for drilling special holes in the shell, etc. Furthermore, the number of parts which must be stocked by each individual dealer is minimized.

There is a high degree of interchangeability of parts to achieve myriads of drum outfits or set-ups. To take but one example, the combined tom-tom 18*a* and cymbal 175 assembly shown in FIG. 20 may be lifted bodily out of the socket on the top of bass drum 10*a* and introduced into the drum stand for snare drum 100 (after removal of tube 20*c* for the snare drum). Conversely, the upper portion of the snare drum and stand shown in FIG. 20 may be mounted on the bass drum 10*a*, in the same receiver. Such great interchangeability applies in numerous types of outfits or set-ups made with the present invention.

Numerous accessories, not shown, may be readily constructed by using the present hardware. These include bell hangers, music stands, double stands, bridge units between adjacent tripod bases, etc.

One of the numerous advantages of the preferred forms of the present hardware is that each clamp 108 is largely concealed within a receiver which desirably has an aesthetically attractive peripheral configuration.

The previously-indicated radial clearance between tubes 20*c* and 90*c*, etc., which permits the cam pre-locking action described above relative to reference letters "C" in FIGS. 9 and 19, provides the additional advantage of permitting free-sliding between the telescoped tubes when set screw 117 is loose. Furthermore, the tolerances between the clamp and receiver surfaces are not close or "precision" in the preferred (production) embodiments. Not only is there thus free-sliding (and also easy nesting of the clamp in the receiver), but the manufacturing process is facilitated.

For certain sizes of tubes, and in order to permit standard steel tubing to be used, an insert sleeve may be mounted (as, for example, by press-fitting) at the end of the outer one of the telescoped tubes. Referring, for example, to FIG. 9*a*, let it be assumed (hypothetically) that the illustrated tube portion 90*c* is not the actual full-length tube but instead a short steel-tube insert (one and one-half inches long, for example). The inner and outer diameters of element 105 in FIG. 9*a* are then increased sufficiently to receive the end of the full-length tube. The full-length tube, with its short tubular insert press-fit therein, is press-fit into element 105 and seated on the lower surface of the necked-down region of the casting. By thus using inserts, standard steel tubing of standard diameters may be employed while still achieving the desired radial clearances.

It is pointed out that the use of large clamps, tubes, etc., is important in those many situations where strength and ruggedness are to be achieved. Thus, the tubing for high-strength applications is about one inch in diameter, or greater. The clamps 108 are much larger in diameter and also have very substantial axial dimensions (for example, five-eighths of an inch). There is therefore much bearing area between clamp and tube, and between clamp and receiver, for extremely high strength, ruggedness and wear resistance.

SPECIFIC EXAMPLE

The following specific example is given by way of example only, not limitation.

As a specific example, tubes 20*c*, 20*b*, etc., are made from standard steel tubing, having a one-inch outer diameter. The steel is alloy number C-1010.

The non-ferrous metal, namely aluminum, forming each clamp and each receiver is aluminum alloy Number 380, A.S.T.M. Number SC 84A.

Referring to FIG. 9*a*, the wall thickness of the one-inch outer diameter tube 20*c* is 0.049 inch. The outer tube 90*c* (in which tube 20*c* telescopes) has a 1.125 inch outer diameter, and also has a 0.049 inch wall thickness. The inner diameter of outer tube 90*c* is therefore 1.027 inch. The clearance between tubes 20*c* and 90*c* is 0.027 inch on diameters (the radial clearance being about 0.013 inch).

Clamp 108 is, when in its "free" (uncompressed) condition, reamed to an inner diameter in the range 1.020/1.015 inch. Thus, it will slide freely on the one-inch outer diameter tube 20*c* until clamp tightening is effected in one of the described ways.

The outer diameter of the "free" (as-cast) clamp 108 is in the range 1.375/1.370 inch, at its circular body portion (namely, along a diameter which extends left-right as viewed in FIG. 9).

The inner diameter of receiver 109 (FIGS. 9, 9*a*) is in the range 1.385/1.380 inch, again at such left-right diameter in FIG. 9.

The left-right distance across the receiver gap, namely the left-right distance between the closest (to each other) portions of wall ends 107*a*, 109*a* in FIG. 9, is 1.03 inch.

The foregoing detailed description is to be clearly understood as given by way of illustration and example only, the spirit and scope of this invention being limited solely by the appended claims.

We claim:

1. Apparatus for use in supporting percussion musical instruments and accessories therefor, said accessories and instruments having first and second members that are adapted to be detachably connected together in adjusted relative positions and thereafter detached and re-attached without disturbing the adjusted relative positions upon such re-attachment, said apparatus comprising:

a first connector part including means for fixedly connecting said part to said first member in a selected position of relative adjustment of said first part and first member, a second connector part adapted to be connected to said second member, one of said connector parts having an outwardly facing surface of a non-circular configuration and the other of said connector parts having an inwardly facing surface of a non-circular configuration substantially congruent with said surface configuration of said one connector part, said one connector part comprising a substantially C-shaped clamping element at least partially circumscribing a portion of said first member, said clamping element including a non-circular external surface portion that forms and defines said outwardly facing surface, said clamping element including a circular main body portion of substantially uniform thickness, having an aperture extending therethrough adapted to adjustably receive said first member, having a pair of outwardly projecting juxtaposed clamp lugs, and having an outwardly projecting key, said clamping element including means for forcibly drawing said clamp lugs together to distort the clamping element main body portion into clamping engagement about a member extending through the aperture thereof, said other connector part being adapted to slidably receive said outwardly facing surface of said one connector part in a snug, interfitting non-rotational relation, said other connector part comprising a receiver element having a recess formed therein, said recess having dimensions and configuration adapted to snugly and slidably receive at least a portion of said clamping element, said recess of said other connector part including an outwardly projecting recess section adapted to receive said outwardly projecting key of said clamping element, said recess including a discontinuous section for receiving said juxtaposed clamping lugs, and means for restraining withdrawal of said one connector part from said other connector part.

2. The apparatus of claim 1 wherein said key is formed with a longitudinally extending groove and wherein said means for restraining withdrawal comprise a manually operable clamp screw threaded through said receiver element into engagement with said groove of said key.

3. Apparatus for use in supporting percussion musical instruments and accessories therefor, said accessories and instruments having first and second members that are adapted to be detachably connected together in adjusted relative positions and thereafter detached and re-attached without disturbing the adjusted relative positions upon such re-attachment, said apparatus comprising:

a first connector part including means for fixedly connecting said part to said first member in a selected position of relative adjustment of said first part and first member, said fixedly connecting means including a C-shaped body portion substantially encircling said first member and having a pair of outwardly projecting clamp lugs, means for drawing the lugs together to clamp said body portion to said first member, and a key fixed to and projecting from said body portion and spaced along the periphery thereof from said outwardly projecting clamping lugs, a second connector part adapted to be connected to said second member, one of said connector parts having an outwardly facing surface of a non-circular configuration and the other of said connector parts having an inwardly facing surface of a non-circular configuration substantially congruent with said surface configuration of said one connector part, said other connector part being adapted to slidably receive said outwardly facing surface of said one connector part in a snug, interfitting non-rotational relation, said other connector part including upstanding wall means defining a recess adapted to snugly and slidably receive said body portion and said key, and means for restraining withdrawal of said one connector part from said other connector part, said means comprising a locking element threaded in one of said connector parts and adapted to bear against the other of said connector parts.

4. Apparatus for use in supporting percussion musical instruments and accessories therefor, said accessories and instruments having first and second members that are adapted to be detachably connected together in adjusted relative positions and thereafter detached and re-attached without disturbing the adjusted relative positions upon such re-attachment, said apparatus comprising:

a first connector part including means for fixedly connecting said part to said first member in a selected position of relative adjustment of said first part and first member, said fixedly connecting means including a C-shaped body portion substantially encircling said first member and having a pair of outwardly projecting clamp lugs, means for drawing the lugs together to clamp said body portion to said first member, and a key fixed to and projecting from said body portion and spaced along the periphery thereof from said outwardly projecting clamping lugs, a second connector part adapted to be connected to said second member, one of said connector parts having an outwardly facing surface of a non-circular configuration and the other of said connector parts having an inwardly facing surface of a non-circular configuration substantially congruent with said surface configuration of said one connector part, said other connector part being adapted to slidably receive said outwardly facing surface of said one connector part in a snug, interfitting non-rotational relation, said other connector part including upstanding wall means defining a recess adapted to snugly and slidably receive said body portion and said key, said other connector part including an outwardly projecting body section, said other connector part being formed with an aperture extending therethrough for slidably adjustable reception of said first member, said aperture being interposed between said outwardly projecting body section and a portion of said recess that receives said key, means on said outwardly extending body section for connecting said other connector part to said second member, and means for restraining withdrawal of said one connector tor part from said other connector part.

5. Apparatus for use in supporting and connecting percussion musical instruments and accessories therefor, said apparatus comprising first and second members adapted to be detachably connected together in rigid, repeatable relatively adjusted positions, one of said members comprising an elongated support of cylindrical external configuration, a clamp connected to said elongated cylindrical support for axial and rotatable adjustment relative thereto, said clamp comprising a tubular clamp body at least partially circumscribing said elongated cylindrical support, said clamp body including a pair of mutually spaced juxtaposed clamp lugs, and a clamp screw interconnecting said clamp lugs, a clamp receiver comprising a receiver body having an aperture extending therethrough adapted to receive said elongated cylindrical support, said receiver body including means for defining an outwardly opening recess therein, said recess defining means including a recess bottom wall and a pair of mutually spaced side walls upstanding from said bottom wall and disposed about said receiver body aperture, said upstanding side walls and said bottom wall collectively defining a recess configuration that snugly and slidably receives said clamp with an end of said tubular clamp body in contiguity with said recess bottom wall and said upstanding wall in snug engagement with said tubular clamp body, and interfitting means on said tubular clamp body and on said receiver body for restraining relative rotation of said clamp and receiver body, said means for restraining relative rotation comprising a key formed on said clamp and spaced about the periphery thereof from said clamp lugs, and further comprising a mating keyway formed in said receiver body for receiving said key.

6. The apparatus of claim 5 wherein said key is formed with an outwardly facing longitudinal groove and wherein said apparatus includes a locking element threadedly engaged in said receiver body and having an end portion adapted to be pressed against said groove of said key.

7. Hardware for use in combination with elements in the field of percussive musical instruments, their components and accessories, said hardware comprising:

(a) an elongated member having an end portion adapted to be inserted into an opening in an element, (b) a clamp adapted to be mounted on said elongated member, said clamp including means to lock said clamp on said member at a desired axial position thereon, said clamp then being in a certain rotational position about the axis of said member, and (c) means adapted to be associated with said clamp and with said element to prevent axial movements of said clamp in both directions relative to said element, and prevent rotational movements of said clamp in both directions relative to said element, when said end portion of said elongated member is in inserted condition in said opening, said means (c) including adjustable means directly engaged with said clamp when said adjustable means is in a locking position, whereby said means (c) prevents all axial and rotational movements of said elongated member relative to said element when said clamp is locked on said member, said means (c) being such that both the axial position of said elongated member, and the rotational position of said elongated member about said axis are then predetermined by said axial and rotational position of said clamp, said means (c) being releasable to permit withdrawal of said end portion of said elongated member from said opening to achieve disconnection, and being reconnectable to again hold said clamp and thus said elongated member in said predetermined axial and rotational position.

8. The invention as claimed in claim 7, in which said elongated member has a substantially cylindrical exterior surface, in which said clamp is generally C-shaped, in which said lock means comprises means to draw the ends of said clamp towards each other to thus frictionally lock said clamp at any desired axial position on said elongated member and also at any desired rotational position thereon about said axis of said elongated member, and in which said elements (b) and (c) are shaped to be thus associated with each other when, and only when, said clamp is in substantially a single rotated condition relative to said means (c).

9. The invention as claimed in claim 8, in which said adjustable means of clause (c) comprises a screw adapted when tightened to directly engage said clamp.

10. A combination of hardware with at least one element in the field of percussive musical instruments and their accessories, said combination comprising:

(a) an element of a percussive musical instrument,
(b) an elongated member having a substantially cylindrical exterior surface,
(c) a clamp frictionally locked on said cylindrical member,
said clamp comprising a generally C-shaped body and a threaded fastener mounted on such C-shaped body to draw the ends thereof towards each other and thus frictionally lock said clamp at any desired axial position on said cylindrical member and at any desired rotated position about the axis of said cylindrical member, and
(d) a receiver mounted fixedly on said element (a),
said receiver having an opening therein through which a portion of said cylindrical member extends, said receiver being so shaped that said clamp is nested therein in seated condition when a portion of said cylindrical member extends into said opening,
said receiver also being so shaped that said clamp may thus nest only when said clamp is in a predetermined rotated relationship relative to said receiver, whereby said cylindrical member must also have a predetermined rotated relationship relative to said receiver when said clamp is frictionally locked on said cylindrical member and is nested in said receiver, the result being that said clamp and said receiver determine both the rotated condition of said cylindrical member relative to said element, and the degree of extension of said cylindrical member into said opening.

11. The invention as claimed in claim 10, in which a set screw is extended radially-inwardly through said receiver and into engagement with said clamp to thereby apply pressure to said clamp in a direction transverse to the axis of said cylindrical member, said set screw effecting a pre-locking action when said clamp is loose relative to said cylindrical member and a double-locking action when said clamp is locked onto said cylindrical member as recited in clause (c).

12. The invention as claimed in claim 10, in which the radial thickness of said clamp is substantially uniform about the circumference of said cylindrical member, whereby to achieve a relatively uniform clamping action about the circumference of said cylindrical member.

13. Connector hardware for use in percussive musical instruments and their accessories, which comprises:

(a) an elongated member,
(b) a clamp mounted on said member in substantially encompassing relationship therearound,
said clamp being adapted to be clamped on said member at various axial positions therealong and at various rotated positions about the axis of said member, and
(c) a receiver adapted to receive an end portion of said member and also adapted to receive at least a substantial part of said clamp,
said receiver comprising wall portions which extend upwardly into adjacency with portions of said clamp which encompass said member,
said wall portions preventing substantial turning of said clamp about the axis of said member, and also preventing substantial turning of said member about said axis when said clamp is in clamped relationship on said member.

14. The invention as claimed in claim 13, in which said member has a substantially cylindrical exterior surface, in which said clamp has a generally C-shaped portion encompassing the major portion of the circumference of said surface, said clamp also having outwardly extending lugs at the ends of said C-shaped portion, said clamp further having means to force said lugs towards each other to thus reduce the diameter of the clamp and frictionally clamp said clamp on said cylindrical surface, and in which said wall portions are sufficiently extensive that said clamp may seat in said receiver only when said clamp is substantially in a single rotated position about said axis of said member.

15. The invention as claimed in claim 14, in which said elongated member is a steel tube, in which said clamp is an aluminum casting, in which the inner diameter of said C-shaped portion is somewhat greater than that of said cylindrical surface when said C-shaped portion is in a free unstressed condition, and in which said wall portions have a gap therebetween through which said lugs project radially of said tube.

16. The invention as claimed in claim 13, in which set-screw means are threaded radially-inwardly through one of said wall portions and into engagement with said clamp to thus prevent withdrawal thereof from said receiver, whereby to also prevent withdrawal of said elongated member from said receiver.

17. Connector hardware, which comprises:

(a) an elongated member,
(b) a clamp positioned on said member and adapted when in loose condition to be shifted to various longitudinal positions on said member and also to various rotated positions about the axis of said member,
(c) a receiver shaped to receive an end section of said member, and also shaped to receive at least a portion of said clamp, and
(d) fastener means mounted in said receiver and adapted upon being tightened to engage said clamp when said clamp is seated on said receiver,
said fastener means extending generally radially inwardly relative to the axis of said member, the relationships between said fastener means, said member, said clamp and said receiver being such that tightening of said fastener means (d) effects cocking and binding of said member which causes fixing of the position, both axially and rotationally, of said member relative to said receiver even when said clamp is in loose condition and despite the fact that said fastener means does not engage said member, the degree of said binding action being regulatable, by varying the degree of pressure exerted by said fastener means, to such extent that said member will remain axially and rotationally positioned relative to said receiver until the musician intentionally adjusts the position of said member, whereby the musician may easily make preliminary set-ups and adjustments before effecting clamping of said clamp onto said member, the musician thereafter effecting clamping of said clamp and full tightening of said fastener means to cause cooperation between said clamp and said tightened fastener means in maintaining a fixed, firm, locked relationship between said receiver and said member.

18. The invention as claimed in claim 17, in which cam means are provided on said receiver to at least partially tighten said clamp in response to said tightening of said fastener means.

19. The invention as claimed in claim 17, in which said receiver is so shaped as to receive said clamp only when said clamp is in substantially a single rotated position about the axis of said elongated member, said receiver then preventing substantial rotation of the received clamp about said axis even when said fastener means is fully loosened.

20. Connector hardware adapted to selectively achieve pre-locking and double-locking actions, and to achieve automatic repeatability of both axial and rotational positions between the members being connected, said connector hardware comprising:

(a) an inner member, (b) a clamp incorporating tightening means whereby the clamp is adapted to be locked by any one of various desired positions on said inner member, (c) means to mate with said clamp and shaped to hold said clamp is substantially a single rotated position about the axis of said inner member, whereby said inner member is likewise held in a single rotated position about said axis when said clamp is clamped on said member, and (d) adjustable means to bear against said clamp and thus effect holding of said inner member, said adjustable means being adapted to provide a pre-locking action of said inner member prior to locking of said clamp on said inner member, said adjustable means, said clamp and said means (c) effecting a double-locking action when both said clamp and said adjustable means are tightened.

21. Compound clamp hardware for musical drums and their accessories, said hardware comprising:

(a) a generally C-shaped portion adapted to be clamped in substantially encompassing relationship around a first elongated member, and (b) means rigidly and permanently connected to said C-shaped portion and adapted to be connected to a second elongated member, said means (b) being removably secured in a receiver provided at the end of said second elongated member, the relationship between said C-shaped portion and said means (b) being such that said first and second elongated members are in transverse relationship to each other when connected to said clamp.

22. Compound clamp hardware for musical drums and their accessories, said hardware comprising:

(a) a generally C-shaped portion adapted to be clamped in substantially encompassing relationship around a first elongated member, and (b) means rigidly and permanently connected to said C-shaped portion and adapted to be connected to a second elongated member, said second elongated member being removably secured in an aperture in said means (b), the relationship between said C-shaped portion and said means (b) being such that said first and second elongated members are in transverse relationship to each other when connected to said clamp.

23. Compound clamp hardware for musical drums and their accessories, said hardware comprising:

(a) a generally C-shaped portion adapted to be clamped in substantially encompassing relationship around a first elongated member, and (b) means rigidly and permanently connected to said C-shaped portion and adapted to be connected to a second elongated member, said means (a) and (b) being integral with each other, being one-piece with no connections or joints therebetween, the relationship between said C-shaped portion and said means (b) being such that said first and second elongated members are in transverse relationship to each other when connected to said clamp.

24. A compound clamp assembly, which comprises:

(a) a receiver element shaped to receive therein at least a major portion of a generally C-shaped clamp, (b) a compound clamp having a portion shaped to be received in said receiver element, said clamp also having a clamp portion adapted to be clamped around an elongated member, (c) an element secured to said receiver, said element being a part of a percussive musical instrument assembly, and (d) means to lock said receiver element in said first-mentioned clamp portion set forth at the beginning of clause (b).

25. The invention as claimed in claim 24, in which said receiver and said compound clamp portion received therein are so shaped relative to each other that they have only a single relative rotated condition about a common axis.

26. The invention as claimed in claim 24, in which a clamp is provided which is not compound and is also adapted to be received in said receiver element, said last-mentioned clamp being adapted to be clamped around a tube when the latter is extended through said receiver and into an element (c), said last-mentioned clamp and said compound clamp being adapted to be used interchangeably with said receiver.

27. The invention as claimed in claim 26, in which said receiver portion recited at the beginning of clause (b) has provided thereon an element which stimulates said last-mentioned tube and thus provides additional stability to the assembly.

28. Apparatus for supporting and positioning drums and other percussive musical instruments and musical instrument accessories, said apparatus comprising:

(a) an elongated support member, (b) a generally C-shaped clamp extending around said support member, said clamp being adapted to be clamped exteriorly on said support member at desired axial positions therealong, and at desired rotational positions about the axis thereof, (c) a receiver adapted to seat said clamp,
said receiver having an open portion which receives said support member when said clamp is in seated position, said receiver and said clamp having cooperating locating portions causing said clamp to be and remain in a predetermined rotated position relative to said receiver when said clamp is seated on said receiver, and (d) elongated threaded fastener means threadedly associated with said receiver,
said threaded fastener means being disposed in a plane generally perpendicular to the axis of said support member when said support member is received in said receiver, said threaded fastener means being disposed adjacent said clamp when said clamp is seated on said receiver, said threaded fastener means being adapted when tightened to effect shifting of said support member laterally against a portion of said receiver which is adjacent said clamp, to thus inhibit longitudinal movement of said support member relative to said receiver,
whereby said clamp, said receiver and said threaded fastener means are provided in compact relationship and are operable, when said clamp and threaded fastener means are tightened, to prevent both longitudinal and rotational shifting of said support member,
said threaded fastener means being operable when loosened to permit withdrawal of said support member, together with said clamp, from adjacent said receiver whereby the same desired rotational and axial position of said support member may be quickly achieved upon subsequent repositioning of said support member and clamp adjacent said receiver,
said clamp when loosened being adapted to be shifted to different axial and rotational positions on said support member and tightened thereat, thus achieving different axial and rotational positions of said support member upon subsequent positioning of said support member and clamp adjacent said receiver.

29. The invention as claimed in claim 28, in which said apparatus is combined with at least one percussive musical drum, said receiver being mounted on the shell of said drum.

30. The invention as claimed in claim 28, in which said receiver is mounted on a tube means, in spaced relationship from any drum.

31. The invention as claimed in claim 28, in which said support member is a tube of circular section, in which an element is shifted by said threaded fastener means, forcibly against said support member, when said threaded fastener means is tightened, said element having a surface conforming to a large part of the exterior of said tube to thus increase the frictional forces resulting from tightening of said threaded fastener means.

32. The invention as claimed in claim 31, in which said element which is shifted by said threaded fastener means is said clamp.

33. The invention as claimed in claim 28, in which said threaded fastener means is radially adjacent said clamp, and extends radially of said support member, when said clamp is seated on said receiver.

34. The invention as claimed in claim 28, in which said cooperating locating portions comprise a recess in one of said clamp and receiver elements, and a protuberance on the other of said elements and shaped to be received in said recess, so that said clamp may be seated on said receiver only when in a single rotated position relative thereto.

35. The invention as claimed in claim 34, in which said cooperating locating portions comprise a protuberance on said clamp, and a recess in said receiver, said clamp being a casting having said protuberance formed integrally thereon.

36. The invention as claimed in claim 28, in which said clamp is a casting of non-ferrous metal, and has a thick wall the dimensions of which are substantially uniform about the circumference of said support member.

37. Apparatus for supporting and positioning drums and other percussive musical instruments and musical instrument accessories, said apparatus comprising:

(a) an elongated support member, (b) a generally C-shaped clamp extending around said support member,
said clamp being adapted to be clamped exteriorly on said support member at desired axial positions therealong, and at desired rotational positions about the axis thereof, (c) a clamp connector adapted to seat said clamp,
said clamp connector having an open portion which receives said support member when said clamp is in seated position, said clamp connector and said clamp having cooperating locating portions causing said clamp to be and remain in a predetermined rotated position relative to said clamp connector when said clamp is seated on said clamp connector, and (d) elongated threaded fastener means threadedly associated with at least one of said clamp connector and clamp,
said threaded fastener means being disposed in a plane generally perpendicular to the axis of said support member when said support member is received in said clamp connector,
said threaded fastener means being disposed adjacent both said clamp and clamp connector when said clamp is seated on said clamp connector,
said threaded fastener means being adapted when tightened to inhibit longitudinal movement of said support member relative to said clamp connector,
whereby said clamp, said clamp connector and said threaded fastener means are provided in compact relationship and are operable to prevent both longitudinal and rotational shifting of said support member relative to said clamp connector,
said threaded fastener means being operable when loosened to permit withdrawal of said support member, together with said clamp, from adjacent said clamp connector whereby the same desired rotational and axial position of said support member may be quickly achieved upon subsequent repositioning of said support member and clamp adjacent said clamp connector, said clamp when loosened being adapted to be shifted to different axial and rotational positions on said support member and tightened thereat, thus achieving different axial and rotational positions of said support member upon subsequent positioning of said support member and clamp to said clamp connector.

38. Apparatus for supporting and positioning parts of sets of percussive musical instruments and musical instrument accessories, said apparatus comprising:

(a) an elongated support member having a generally cylindrical exterior surface, (b) a generally C-shaped clamp extending around said support member, said clamp being adapted to be clamped exteriorly on said support member at desired rotational positions about the axis thereof, (c) an elongated tube of generally circular cross-section, the diameter of said tube being sufficiently large to receive said support member in telescopic relationship, (d) a receiver fixedly mounted at one end of said tube, said receiver being adapted to seat said clamp, said receiver having an open portion which receives said support member when said clamp is in seated position, whereby said support member may telescope into said tube, said receiver and said clamp having cooperating locating portions causing said clamp to be and remain in a predetermined rotated position relative to said receiver when said clamp is seated on said receiver, and (e) means to effect shifting of said support member laterally against a portion of said receiver which is adjacent said clamp when said clamp is seated on said receiver to thus inhibit longitudinal movement of said support member relative to said receiver, all portions of said means (e) being disposed adjacent the plane of said clamp when said clamp is seated on said receiver, whereby said clamp, said receiver and said means (e) are provided in compact relationship and are operable, when said clamp and said means (e) are tightened, to prevent shifting of said support member, said means (e) being operable when loosened to permit withdrawal of said support member, together with said clamp, from adjacent said receiver whereby the same desired position of said support member may be quickly achieved upon subsequent repositioning of said support member and clamp adjacent said receiver, said clamp when loosened being adapted to be shifted to different positions on said support member and tightened thereat, thus achieving different positions of said support member upon subsequent positioning of said support member and clamp adjacent said receiver.

39. Apparatus for supporting and positioning drums and other percussive musical instruments and musical instrument accessories, said apparatus comprising:

(a) an elongated support member, (b) a generally C-shaped clamp extending around said support member, said clamp being adapted to be clamped exteriorly on said support member at desired axial positions therealong, and at desired rotational positions about the axis thereof, (c) a receiver adapted to seat said clamp, said receiver having an open portion which receives said support member when said clamp is in seated position, said receiver and said clamp having cooperating locating portions causing said clamp to be and remain in a predetermined rotated position relative to said receiver when said clamp is seated on said receiver, and (d) means to effect shifting of said support member laterally against a certain portion of said receiver to thus inhibit longitudinal movement of said support member relative to said receiver, no portion of said means (d) being spaced a substantial distance away from the plane of said clamp when said clamp is seated on said receiver, said certain portion of said receiver being adjacent the plane of said clamp when said clamp is seated on said receiver, whereby said clamp, said receiver and said means (d) are provided in compact relationship and are operable, when said clamp and said means (d) are tightened, to prevent both longitudinal and rotational shifting of said support member, said means (d) being operable when loosened to permit withdrawal of said support member, together with said clamp, from adjacent said receiver whereby the same desired rotational and axial position of said support member may be quickly achieved upon subsequent repositioning of said support member and clamp adjacent said receiver, said clamp when loosened being adapted to be shifted to different axial and rotational positions on said support member and tightened thereat, thus achieving different axial and rotational positions of said support member upon subsequent positioning of said support member and clamp adjacent said receiver.

* * * * *